United States Patent
Prüssmeier et al.

(10) Patent No.: US 9,806,647 B2
(45) Date of Patent: Oct. 31, 2017

(54) CONTROL SYSTEM FOR AN ELECTRIC MOTOR

(71) Applicant: Beckhoff Automation GmbH, Verl (DE)

(72) Inventors: Uwe Prüssmeier, Lemgo (DE); Jan Achterberg, Duisburg (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 0 days.

(21) Appl. No.: 15/043,937

(22) Filed: Feb. 15, 2016

(65) Prior Publication Data

US 2016/0241173 A1 Aug. 18, 2016

(30) Foreign Application Priority Data

Feb. 17, 2015 (DE) .......................... 10 2015 102 236

(51) Int. Cl.
| | | |
|---|---|---|
| H02K 41/00 | (2006.01) | |
| H02P 6/12 | (2006.01) | |
| H02P 6/00 | (2016.01) | |
| H02P 29/024 | (2016.01) | |

(52) U.S. Cl.
CPC .............. *H02P 6/12* (2013.01); *H02P 6/006* (2013.01); *H02P 29/024* (2013.01)

(58) Field of Classification Search
CPC . H02P 7/02; H02P 8/005; H02P 25/06; H02K 41/02
USPC ........................................................ 318/135
See application file for complete search history.

(56) References Cited

U.S. PATENT DOCUMENTS

| | | | | | |
|---|---|---|---|---|---|
| 6,462,491 | B1* | 10/2002 | Iijima | ...................... | H02P 9/18 |
| | | | | | 318/400.09 |
| 6,952,086 | B1* | 10/2005 | Krefta | .................... | H02K 17/30 |
| | | | | | 310/12.19 |
| 2003/0210006 | A1* | 11/2003 | Kusaka | ..................... | H02P 1/46 |
| | | | | | 318/437 |
| 2004/0257027 | A1* | 12/2004 | Matsuo | ................... | H02P 21/18 |
| | | | | | 318/722 |
| 2005/0159228 | A1* | 7/2005 | Otavsky | .................... | F16C 3/02 |
| | | | | | 464/180 |
| 2007/0069674 | A1* | 3/2007 | Koeppl | ................ | B62D 5/0484 |
| | | | | | 318/432 |

(Continued)

FOREIGN PATENT DOCUMENTS

| | | | |
|---|---|---|---|
| CN | 201936155 U | * | 8/2011 |
| DE | 10161227 A1 | | 7/2003 |

(Continued)

Primary Examiner — Bickey Dhakal
(74) Attorney, Agent, or Firm — Dorsey & Whitney LLP

(57) ABSTRACT

A control system for an electric motor comprising a stator having a plurality of stator coils and a rotor movable along the stator comprises a position detection device and a coil monitoring device. In this case, the position detection device is designed to generate position data representing a position of the rotor along the stator, and the coil monitoring device is designed to generate coil data representing a status of one or a plurality of the stator coils. The control system furthermore comprises a safety device designed to carry out a coordination between the coil data and the position data. Moreover, the safety device is designed to cause the electric motor to be transferred to a safe state if an error has been discovered during the coordination.

13 Claims, 14 Drawing Sheets

(56) References Cited

U.S. PATENT DOCUMENTS

2014/0028160 A1* 1/2014 Yamada ................. H02K 19/12
                                                              310/68 B
2014/0265960 A1* 9/2014 Sonoda .................... H02P 6/12
                                                              318/400.21

FOREIGN PATENT DOCUMENTS

| DE | 10320126 A1 | 12/2003 |
|----|----|----|
| DE | 69432226 T2 | 1/2004 |
| DE | 112005001533 T5 | 5/2007 |
| DE | 102012204917 A1 | 10/2013 |
| EP | 2067250 B1 | 12/2009 |

* cited by examiner

CONTROL SYSTEM FOR AN ELECTRIC MOTOR

BACKGROUND

The present invention relates to a control system for an electric motor, a drive having a control system and an electric motor, and a method for controlling an electric motor.

Drives having electric motors are used, inter alia, in automation technology in order to set machine parts in motion, for instance in the case of packaging machines or in the case of transport systems. Particularly if a product or a machine element is intended to be movable over a relatively long path, linear motors comprising a stator and one or a plurality of rotors movable along the stator are used as electric motors. The rotors are driven by means of a magnetic field which is generated by drive coils through which current flows, said magnetic field interacting with permanent magnets of the motor. In this case, either the drive coils or the permanent magnets are arranged on the stator and the respective other drive elements are arranged on the rotors.

In automation technology, inter alia, drives are often embodied as position-controlled drives or servo drives. In this case, the drive has a control system that continuously detects the position of the rotor along the stator. The position of the rotor is controlled to a predefined value during operation by the control system on the basis of the detected position by means of a closed control loop. For this purpose, the control system generally comprises a position detection device and an operating device. A position detection device suitable for a linear motor is disclosed in the document DE 102012204917 A1, inter alia. Programmable logic controllers or industrial PCs are often used as operating devices.

In order to ensure safe operation of machines with such drives, those movements which constitute a safety risk must be reliably prevented. Such a safety risk may reside, inter alia, in an endangerment of operating or maintenance personnel or in a movement that leads to damage to the machine, as may be the case for instance when colliding with a stop without any braking. Guiding principles of design for safety-related parts of machine controllers are predefined by international standards, inter alia. Depending on extent of damage and frequency of damage, safety-critical states or systems which prevent the occurrence of such states are assigned to a safety integrity level (SIL) or performance level (PL).

In order to enable safe operation of the drive, a machine assigned to the drive is generally monitored in a safety-relevant area, also called protection area, by means of safety sensors. Light barriers, switching contacts on guard doors, contact mats or camera systems are used, inter alia, as safety sensors. If a safety-critical state, for instance the entry of a person into the protection area, is discovered by means of the safety sensors, the drive is immediately switched safely to have no energy or no current, with the result that the drive can no longer exert any force. Suitable functions for stopping machine drive elements are internationally standardized.

What is disadvantageous about the drive being immediately switched to have no current is that, after a safety-critical state has occurred, the drive and thus the associated machine are deactivated and the work sequence is thus interrupted. In particular, it is not possible to define safe operating states in which although the drive is still supplied with energy, operating parameters of the drive do not exceed predefined safety limits.

SUMMARY

It is an object of the present invention to provide a control system for an electric motor which enables safe operation of the motor. It is a further object of the invention to provide a drive having an electric motor which enables safe operation of the electric motor. In addition, it is an object of the invention to specify a method for controlling an electric motor which enables safe operation of the electric motor.

These objects are achieved by means of a control system as claimed in claim 1, a drive as claimed in claim 10 and a method for controlling an electric motor as claimed in claim 13. Further advantageous embodiments are respectively specified in the dependent claims.

EXAMPLES

A control system for an electric motor comprising a stator having a plurality of stator coils and a rotor movable along the stator comprises a position detection device and a coil monitoring device. In this case, the position detection device is designed to generate position data representing a position of the rotor along the stator, and the coil monitoring device is designed to generate coil data representing a status of one or a plurality of the stator coils. The control system furthermore comprises a safety device designed to carry out a coordination between the coil data and the position data. Moreover, the safety device is designed to cause the electric motor to be transferred to a safe state if an error has been discovered during the coordination.

A coordination between the coil data and the position data enables safe operation of the electric motor in an advantageously simple and cost-effective manner. By way of example, the safety device can check whether an energization of the stator coils is compatible with a rotor position detected by the position detection device. In this case, information about the energization of the stator coils can be determined from the status of the stator coils that is represented by the coil data. The status of one of the stator coils can comprise for example a current flow through the stator coil or a coil current. However, the status of the stator coil can also comprise an activation state of the stator coil, indicating whether the stator coil or a current source assigned to the stator coil for energizing the stator coil is activated or enabled. The status of the stator coils can also comprise a voltage dropped or present across the stator coils.

The coordination between the coil data and the position data can then comprise for example a position comparison between a rotor position determined from the coil data and the rotor position determined by the position detection device. If these positions determined independently of one another match, it can be assumed that the coil data and the position data were detected without errors and were communicated to the safety device without errors. The position and coil data validated in this way can subsequently be used for further checking of the operating state of the drive.

In particular, the position data and the coil data can be used to ensure compliance with safe operating states during the operation of the electric motor. Safety-relevant operating parameters that can be used for defining the safe operating states may be, for example, the position of the rotor along the stator, a speed of the rotor or a drive force exerted on the rotor.

If an error is discovered during the coordination or if an error occurs during the coordination, for example the rotor position derived from the coil data and the rotor position derived from the position data deviate from one another, this indicates potentially safety-critical errors in the position detection or in the energization of the stator coils. The transfer—initiated in response—of the electric motor to a safe state prevents an endangerment on account of an erroneous position or coil data detection; in particular a derivation of safety-relevant operating parameters from the erroneous position or coil data is prevented.

The safe state to which the electric motor is transferred when an error is discovered can include the fact that the electric motor is safely switched to have no energy or no current, such that the rotor movable on the stator can no longer exert any force. The safe state can also include the fact that a control method or control program which controls the electric motor in normal operation is interrupted and the electric motor is moved into a safe position. Irrespective of whether a power supply of the electric motor is interrupted, the transfer of the electric motor to a safe state can generally also be designated as emergency shutdown of the electric motor.

Advantageously, in the case of a control system embodied in this way, safe operation of the electric motor can be realized solely by means of the position detection device and the coil monitoring device. In particular, a safeguarding of the position detection device and a second, redundant position detection device embodied in a safe fashion can be dispensed with for detecting the safety-relevant operating parameters.

In one development of the control system, the control system comprises a position determining module designed to determine a rotor position on the basis of the position data. Moreover, the safety device comprises a position calculation module designed to determine an energization position on the basis of the coil data. The safety device comprises a position comparison module designed to compare the rotor position with the energization position in the context of the coordination. Furthermore, the error comprises an error discovered or occurring during the comparison between the rotor position and the energization position.

In this case, the energization position corresponds to a rotor position which was derived from the status of the stator coils. If a current signal that drives the rotor, for example an AC current signal, is applied to the stator coils for example only in an energization region in the vicinity of the rotor, the position of the rotor along the stator can be coarsely determined from the energization region. A more accurate position determination is possible if the coil data additionally comprise the coil currents in the stator coils and said coil currents are taken into account in the determination of the energization position. In the case of a periodic current signal, the position of the rotor can be determined from the energization region and the phase angle of the current signal.

By virtue of the fact that the safety device is designed to coordinate the rotor position with the energization position, the energization position and the rotor position, or the coil data and the position data, can be validated in an advantageously simple manner. On the basis of the validated data, compliance with safe operating states of the drive can be safely monitored in a simple manner.

Both the position determining module, and the position calculation module and the position comparison module can be embodied as modules of an operating device of the control system. The control system can comprise a programmable logic controller or an industrial PC, for example, as the operating device. The position determining module, the position calculation module and the position comparison module can be embodied in each case as software components or modules of a control program that can be executed on the operating device. The control program can further be designed to perform functions which are used for positional control of the rotor along the stator. In this case, safe operation of the electric motor can advantageously be realized solely with the hardware components required for the positional control.

In one development of the control system, the safety device comprises a current pattern comparison module designed to compare the coil data with predefined setpoint coil data in the context of the coordination. Furthermore, the error comprises an error discovered or occurring during the comparison between the coil data and the predefined setpoint coil data.

The setpoint coil data may have been derived for example from data for controlling the movement of the rotor, for instance from positional control data. The setpoint coil data can contain for example information about which of the stator coils are to be activated for an energization and what coil current is to be adjusted in the activated stator coils. The error discovered or occurring during the comparison between the coil data and the predefined setpoint coil data can comprise for example the fact that a current flow through one of the stator coils that is determined from the coil data deviates from the coil current to be adjusted in this stator coil. The error can also consist in the fact that a stator coil to be activated in accordance with the setpoint coil data is not activated or a stator coil that is not to be activated is activated. By means of the comparison between the coil data and the predefined setpoint coil data, advantageously an erroneous energization of the electric motor that is not compatible with the setpoint coil data can be identified and discovered by the control system and the electric motor can be brought to a safe operating state. An uncontrolled or safety-jeopardizing movement of the rotor can advantageously be prevented as a result.

In one development of the control system, the current pattern comparison module is designed to determine a force on the rotor on the basis of the coil data and to compare the force with a predefined setpoint force. Furthermore, the error comprises an error discovered or occurring during the comparison between the force and the predefined setpoint force, and the predefined setpoint force is dependent on the position of the rotor.

The comparison of the force on the rotor with a predefined setpoint force advantageously enables safe operation of the electric motor, wherein it is ensured that the force exerted by the rotor does not exceed or fall below a predefined limit value. As a result, for example, the electric motor can still be operated even if operating or maintenance personnel are in the vicinity of a machine comprising the electric motor, and the production process need not be interrupted in such a case. The predefined setpoint force can specify for example the maximum force with which the rotor can be moved without personnel present being injured. In this case, the error discovered during the comparison between the force and the predefined setpoint force comprises an exceedance of the predefined setpoint force. However, the setpoint force can also specify a minimum force which is necessary to hold, for example to raise, a safety-relevant machine part in a safe position. In this case, the error discovered during the comparison between the force and the predefined setpoint force comprises an undershooting of the predefined setpoint force by the force.

By virtue of the fact that the predefined setpoint force is dependent on the position of the rotor, advantageously the force exerted by the rotor can be limited in a targeted manner only in those regions of the machine in which the rotor movement constitutes a hazard, while the rotor can be moved without impediment in other areas.

In one development of the control system, the safety device comprises a speed calculation module and a speed comparison module. In this case, the speed calculation module is designed to calculate a speed of the rotor on the basis of the position data and/or on the basis of the coil data. The speed comparison module is designed to compare the speed of the rotor with a predefined setpoint speed. Furthermore, the error comprises an error discovered or occurring during the comparison between the speed and the setpoint speed, wherein the predefined setpoint speed is dependent on the position of the rotor.

The error discovered during the comparison between the speed and the setpoint speed can consist for example in the predefined setpoint speed being exceeded or undershot. By virtue of the fact that the control system is designed to calculate the speed of the rotor and to cause the electric motor to be transferred to a safe state in the event of a predefined setpoint speed being exceeded or undershot, the rotor of the electric motor can advantageously be operated with a safely limited speed or in a safely limited speed range. This advantageously makes it possible to continue to operate the electric motor even if an uncontrolled movement of the motor without speed limitation would constitute a safety risk, for example might endanger persons present.

In one development of the control system, the coil data represent a coil current through one of the stator coils of the electric motor. In one development of the control system, the coil data represent a voltage dropped across one of the stator coils of the electric motor. In one development of the control system, the coil data represent an activation state of one of the stator coils of the electric motor.

This enables an advantageously simple coordination between the coil data and the position data. If only the stator coils in the vicinity of which the rotor is situated are activated for an energization, the position of the rotor along the stator can be roughly determined from the activation state of the stator coils. A more accurate determination of the position of the rotor is possible from the coil currents through the stator coils, for example with the aid of a determination of a phase angle of a periodic current signal driving the rotor. The position of the rotor can likewise be determined from the voltages dropped across the stator coils. Since a movement of the rotor along the stator induces a voltage in the stator coils, the position of the rotor can be determined from the voltage dropped across the stator coils even if no force is exerted on the rotor by means of the magnetic field of the stator coils. The coordination between the coil data and the position data can be carried out for example by the rotor position determined from the coil data being compared with a rotor position determined from the position data.

In one development of the control system, the safety device is embodied by means of safe functional components of the control system. This advantageously makes it possible to realize the safety device in a superordinate operating device, for example in a programmable logic controller or in an industrial PC. In this case, the superordinate operating device can also perform control functions which are not safety-relevant. In particular, a positional control of the rotor can also be performed by the operating device. The safe functional components can comprise for example safely executable program parts of a control program that can be executed on the operating device, in the case of which program parts, inter alia, results are calculated redundantly and a safeguarded data exchange takes place between individual program parts.

In one development of the control system, the control system is designed to apply a proximity current signal to at least one of the stator coils if the rotor of the motor is situated in the vicinity of the stator coil. This advantageously facilitates a determination of the position of the rotor from the coil data at low speeds of the rotor or at a standstill. If the coil data comprise for example a coil current through one or a plurality of the stator coils, then on the basis of the coil current it cannot be differentiated whether the rotor is at a standstill in the vicinity of the corresponding stator coils or is not situated in the vicinity of the stator coils, since no current flows through the relevant stator coils in both cases.

The proximity current signal can be embodied in such a way that it causes only a flux-forming, but not a torque-forming current flow in the stator coils in the vicinity of the rotor. This has the consequence that a magnetic field generated by the current flow exerts no force on the rotor along the stator and thus the rotor is not actively moved. The current flow of the proximity current signal can advantageously be maintained, during the entire operation of the drive, with a magnitude such that a safe and error-free detection of the coil current by the safety device is possible.

A drive having an electric motor comprising a stator having a plurality of stator coils and a rotor movable along the stator comprises a control system and a data transmission medium connecting the stator to an operating device of the control system. In this case, the control system is designed to transmit position data and coil data via the data transmission medium.

Such a drive advantageously allows safe operation of the electric motor. In particular, the position data and coil data transmitted via the data transmission medium can be coordinated with one another and thus verified. On the basis of the verified data, safety-relevant functions of the drive can be implemented; by way of example, the rotor can be moved with a safely complied with force or speed or be held in a safe position.

In one development of the drive, the stator coils and a signal detection unit of the position detection device of the control system are arranged in a stationary fashion with respect to one another and are integrated into a housing of the stator. By way of example, the signal detection unit and the stator coils can be screwed to one another, jointly potted or arranged on a common printed circuit board. Parts of the signal detection unit and/or of the stator coils can in this case also form outer surfaces of the housing.

In this case, the signal detection unit is designed to generate the position data on the basis of the position of the rotor along the stator. A stationary arrangement on the stator advantageously achieves the effect that the relative position of the signal detection unit and of the stator coils cannot change. In particular, the relative position does not change during mounting of the drive or on account of internal or external force action on the drive during operation.

As a result, in the context of the coordination between the coil data and the position data, a fixed relative position between stator coils and signal detection unit can be assumed and safety-relevant conclusions regarding the operating state of the drive can be drawn from the coordination between position data and coil data. In this regard, it can be assumed, in particular, that each region of the signal detection unit can always be assigned the same stator coils and that a position along the stator determined from the coil data can be compared with a position determined from the position data.

In one development of the drive, the drive is designed to transmit the coil data by means of a secure data transmission channel via the data transmission medium. The secure data transmission channel advantageously makes it possible to identify transmission errors during the transmission of the coil data from the stator coils fitted to the stator to the operating unit. As a result, the coil monitoring device and the operating unit can advantageously be considered as one functional unit with regard to the safety of the drive. The secure data transmission channel can be realized with the aid of a secure data transmission protocol enabling a secure data transmission via an otherwise insecure data transmission medium, for example an Ethernet network connection. This advantageously allows both the insecurely transmitted position data and the securely transmitted coil data to be communicated via the same data transmission medium.

A method for controlling an electric motor of a drive comprises as one step generating position data, wherein the position data represent a position of the rotor along the stator. As a further step the method comprises generating coil data representing a status of one or a plurality of the stator coils. As a further step the method comprises carrying out a coordination between the coil data and the position data. As a further step the method comprises causing the electric motor to be transferred to a safe state if an error has been discovered or has occurred during the coordination.

The coordination of the coil data with the position data advantageously allows safe operation of the drive. The status of the stator coils that is represented by the coil data can contain for example information about the current flow or the coil current through the individual stator coils, about the activation state of the stator coils or about the voltages dropped across the stator coils.

The coil data can advantageously be evaluated during the coordination to establish at what position along the stator a force acts on the rotor. For safe operation of the drive, it is necessary for this position to match the rotor position determined from the position data of the position detection device. If an error is discovered in the context of the coordination, that is to say if, for example, an energization position determined from the coil data is not compatible with a rotor position determined from the position data, then this indicates a malfunction of the position detection device or of an energization device that supplies the stator coils with current, and thus a safety-critical state of the drive.

The coordination of the coil data with the position data advantageously makes it possible to ensure that coil currents which enable a safe movement of the rotor along the stator are generated in the stator coils. If the coil currents required for the movement of the rotor are generated only in an energization region in the vicinity of the rotor, the coordination can ensure that the energization region is propagated in a manner matching the movement of the rotor along the stator. Since the rotor can exert a drive force only at the energization location, a safe monitoring of the movement of the rotor along the stator can be realized by means of a safe monitoring of the energization region.

BRIEF DESRIPTION OF THE DRAWINGS

The invention is explained in greater detail below with reference to figures, in which, in a schematic illustration in each case:

Figure 1:
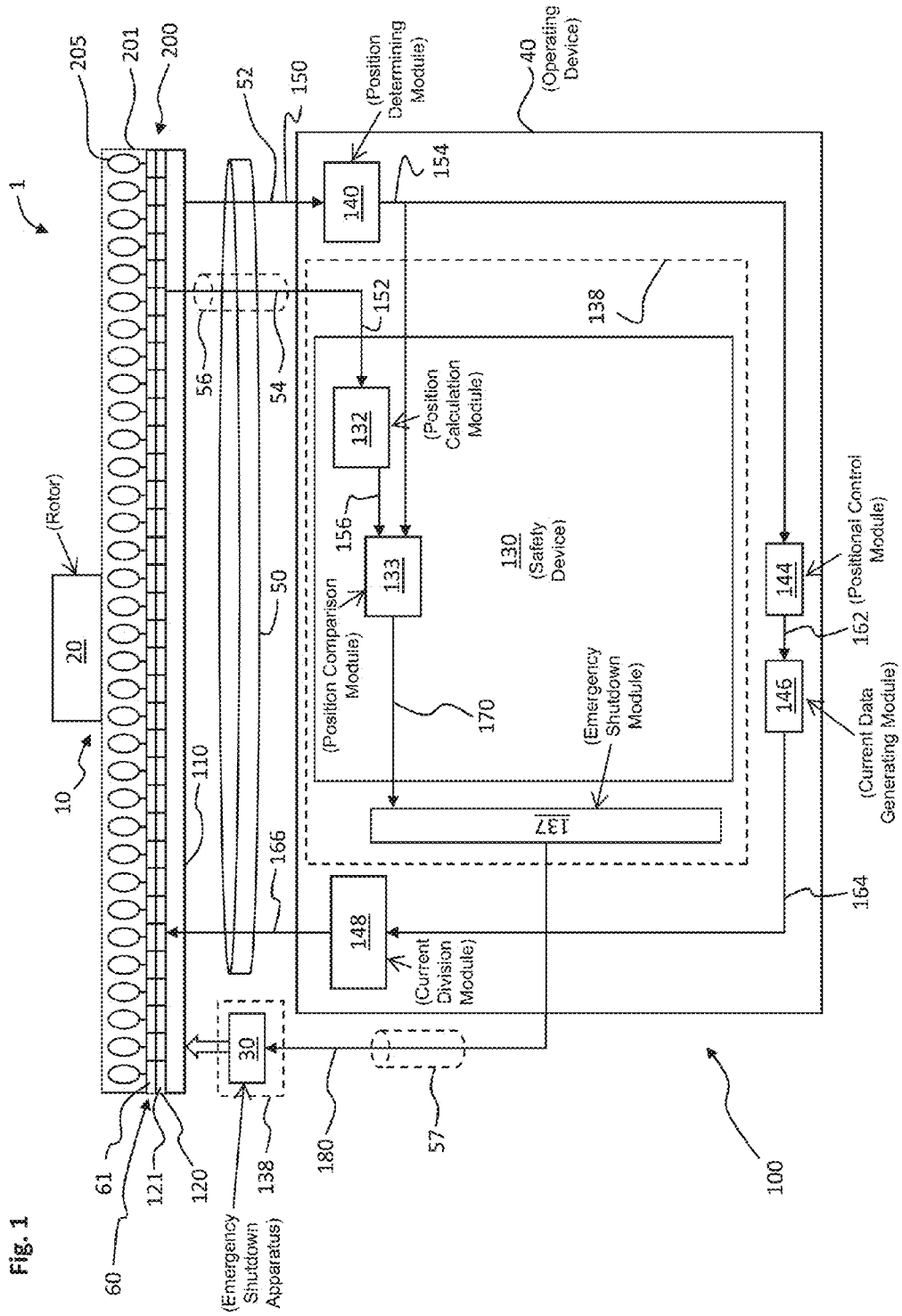
FIG. 1 shows a schematic illustration of a drive having an electric motor and a control system comprising a safety device.

FIG. 1 shows a schematic illustration of a drive 1 comprising an electric motor 10, a control system 100 and a data transmission medium 50. The electric motor 10 is embodied as a linear motor and comprises a stator 200 and a rotor 20 movable along the stator 200. The rotor 20 can be mounted displaceably for example by means of rollers on a guide element—for example a guide rail—arranged along the stator 200. However, the rotor 20 can also be arranged movably in a gas-mounted fashion, in particular in an air-mounted fashion, in a magnet-mounted fashion or in a liquid-mounted fashion on a suitable guide element.

The rotor 20 is driven by means of a plurality of stator coils 205 of the stator 200. The stator coils 205 are arranged over the length of the stator 200 over which the rotor 20 is movable during the operation of the drive 1. In the exemplary embodiment illustrated, the stator coils 205 are arranged in a non-overlapping fashion and alongside one another on the stator 200. In this case, the stator coils 205 are arranged in each case at a regular distance, also called coil distance hereinafter, relative to one another. In other exemplary embodiments, however, the stator coils 205 can also be arranged in an overlapping fashion.

A coil current through the stator coils 205, that is to say a current flow through the stator coils 205, generates a magnetic field that interacts with an excitation unit of the electric motor 10, said excitation unit being arranged on the rotor 20. The excitation unit can comprise for example one or a plurality of drive magnets, which can be embodied as permanent magnets of alternating polarity. However, the excitation unit can also comprise one or a plurality of excitation coils.

The control system 100 is designed to control the movement of the rotor 20 along the stator 200. In this case, the control system 100 controls or regulates the coil currents through the stator coils 205 in such a way that a force directed along or lengthways relative to the stator 200 is exerted on the rotor 20 by means of the interaction of the excitation unit with the magnetic field generated by the coil currents.

The electric motor 10 can be embodied as a synchronous linear motor, for example. In this case, coil currents that form a polyphase AC current signal are generated in the stator coils 205. The number of phases of the AC current signal and the mutual phase angle of the individual coil currents are determined here according to the geometry of the arrangement of the stator coils 205 along the stator 200 and according to the geometry of the excitation unit. By way of example, the excitation unit can comprise five permanent magnets and an AC current signal can be applied to the stator coils 205, for example, in the case of which signal the coil currents in adjacent stator coils 205 have a phase offset of 300°.

The drive 1 comprises an energization device 60 designed to generate the AC current signal in the stator coils 205. The energization device 60 is arranged along the stator 200 and comprises a plurality of independently controllable current sources 61. In this case, each stator coil 205 is assigned respectively one of the current sources 61. For generating the coil currents, the current sources 61 have power electronics, for example four-quadrant controllers or H-bridge circuits. The current sources 61 are designed to generate, from a supply voltage present in the form of a DC voltage at inputs of the current sources 61, the coil current to be applied to the assigned stator coil 205. In this case, the current sources 61 can be operated in a pulsed manner, such that the current flow through the stator coils 205 can be controlled or regulated by means of a pulse width modulation of the coil currents. The supply voltage can be for example in a range of between 1 V and 1000 V; it is preferably in a range of between 10 V and 50 V, and is particularly preferably 48 V.

Each current source 61 of the energization device 60 comprises a current regulating unit that regulates the coil current generated by the power electronics in the assigned stator coil 205. In this case, the coil current is regulated on the basis of control data received by the current sources 61 in each case via a common stator data line. The control data can comprise for example an amplitude value and a phase angle of the coil current to be generated in the respective stator coil 205. In other embodiments, the energization device 60 can also be designed to the effect that one of the current sources 61 regulates the current flow through a plurality of stator coils 205, wherein the stator coils 205 can be connected in parallel or in series, for example. The controlled stator coils 205 could likewise be connected to one another via a star point.

The stator data line via which the current sources 61 obtain the control data can be for example a bus system, in particular an Ethernet-based bus system, which connects the current sources 61 to one another. Data packets can be transmitted via the stator data line, for example by means of low voltage differential signaling (LVDS). However, the stator data line can also be based on a different physical data transmission principle. The stator data line or the bus system can be arranged or embodied on or in the stator 200 of the drive 1.

The data packets can be transmitted via the stator data line for example by means of the Ethernet protocol; in particular, the data packets can be transmitted by means of the EtherCAT data protocol. The EtherCAT data protocol makes it possible to transmit the control data in real time via the stator data line to the current sources 61. Furthermore, it enables short cycle times, has low time base and propagation time fluctuations and allows an exact synchronization of distributed clocks of the connected hardware components, that is to say in particular of the individual current sources 61.

The control data required for controlling the current sources 61 are generated by an operating device 40 of the control system 100. The operating device 40 is connected via the data transmission medium 50 to the stator 200 of the electric motor 10 and in particular to the stator data line. From the operating device 40, the control data in the form of data packets are transmitted via the data transmission medium 50 to the stator 200 and the energization device 60 arranged thereon.

The data transmission medium 50 can be embodied as an Ethernet connection and comprise for example Ethernet network cables or optical waveguides. However, the data transmission medium 50 can also be based on a radio connection. The EtherCAT protocol can be used for data transmission via the data transmission medium 50. Particularly if the EtherCAT protocol is used for the data transmission both via the stator data line and via the data transmission medium 50, data packets addressed to the current sources 61 or to the operating device 40 can be coupled from the data transmission medium 50 into the stator data line or from the stator data line into the data transmission medium 50 in a simple manner. In addition, the entire communication between the operating device 40 and the current sources 61 can be carried out in real time.

In an alternative embodiment of the drive 1, the stator data line and the data transmission medium 50 can also be combined and be realized completely as an Ethernet connection, for example.

The drive 1 is designed to the effect that the AC current signal is applied only to those stator coils 205 which are situated in the vicinity of the rotor 20, in order to generate a force on the rotor 20. The stator coils 205 to which the AC current signal is applied define an energization region of the stator 200. The AC current signal can be applied here for example in each case only to the stator coils 205 which are currently situated directly below the excitation unit of the rotor 20. In this case, the energization region comprises at any point in time those of the stator coils 205 which are situated below the rotor 20.

However, it is also possible to pre-energize or post-energize one or a plurality of stator coils 205 in front of or behind the rotor 20. The energization region then comprises not only the stator coils 205 situated directly below the rotor 20 but also stator coils 205 situated in front of or behind the rotor 20 in the direction of travel. If the rotor moves along the stator 200, the stator coils 205 are energized in such a way that the energization region shifts concomitantly with the rotor 20.

In the case of a pre-energization, for example, the energization of a stator coil 205 situated ahead in the direction of travel as viewed from the rotor 20 can already be begun when the rotor 20 is still situated above a stator coil 205 arranged one, two or even more coil distances away from the stator coil 205 to be newly energized. Expediently, the energization of a stator coil 205 is begun in each case as soon as the rotor 20 has come closer to the relevant stator coil 205 to such a degree that the relevant stator coil 205 can exert a sufficient force on the excitation unit of the rotor 20. In this case, the exact point in time of the beginning of the energization of a stator coil 205 can be chosen such that the AC current signal to be applied to the stator coil 205 has a zero crossing at this point in time. This has the consequence that a high, instantaneous current flow does not have to be generated directly after the beginning of the energization.

In a similar manner, in the case of a post-energization, for example, the AC current signal can be applied to a stator coil 205 already situated behind the rotor 20 in the direction of travel for as long as until the rotor 20 no longer covers an adjacent stator coil 205 situated closer in the direction of the rotor 20. The point in time of the ending of the energization of a stator coil 205 can likewise be chosen in such a way that the AC current signal to be applied to the relevant stator coil 205 precisely has a zero crossing at this point in time.

The control system 100 and the drive 1 can also be designed to the effect that a current source 61 assigned to a stator coil 205 is activated or enabled for an energization of the stator coil 205 only if the rotor 20 is situated in the vicinity of the stator coil 205. If the activation takes place during the approach of the rotor 20 already before the energization of the corresponding stator coil 205 is begun, that is to say before the AC current signal is applied to the corresponding stator coil 205, the current source 61 can regulate the current flow through the stator coil 205 to zero until the beginning of the energization. In this case, the energization region can also comprise all activated stator coils 205 or all stator coils 205 whose current sources 61 are activated.

The individual current sources 61 are controlled in such a way that the coil currents through the individual stator coils 205 overall produce the AC current signal required for generating the force on the rotor 20. In this case, a position control is performed in which, depending on the type of a servo drive, a position of the rotor 20 along the stator 200 is detected by a position detection device 110 of the control system 100. The position detection device 110 generates, on the basis of the position of the rotor 20, position data 150 representing the position of the rotor 20 and transmits the position data 150 to the operating device 40 via the data transmission medium 50. In the operating device 40, a rotor position 154 of the rotor 20 along the stator 200 is calculated from the position data 150 by a position determining module 140 of the control system 100.

For controlling the position of the rotor 20 along the stator 200, the operating device 40 of the control system 100 comprises a positional control module 144 and a current data generating module 146. The positional control module 144 receives the rotor position 154 from the position determining module 140 and determines, from the rotor position 154 and a predefined setpoint position of the rotor 20, a deviation of the rotor position 154 from the setpoint position. On the basis of the deviation, the positional control module 144 determines speed data 162 containing the speed to be adjusted of the rotor 20. In addition to the speed to be adjusted, the speed data 162 can comprise the rotor position 154.

The speed data 162 are transmitted from the positional control module 144 to the current data generating module 146. On the basis of the speed data 162, the current data generating module 146 determines rotor-specific current data 164 representing the AC current signal to be generated for the movement of the rotor 20. The current data generating module 146 can operate analogously to a rotational speed control of a rotary electric motor. The rotor-specific current data 164 can comprise for example the information about the phase angle and the amplitude of the AC current signal to be generated for the rotor 20, and about a frequency with which the phase angle of the AC current signal changes. In addition, the rotor-specific current data 164 can comprise the rotor position 154.

An individual current division module 148 of the operating device 40 of the control system 100 receives the rotor-specific current data 164 from the current data generating module 146. The individual current division module 148 determines from the rotor-specific current data 164 in each case the coil current to be adjusted in each individual one of the stator coils 205. Afterward, coil-specific energization data 166 are generated by the individual current division module 148 of the operating device 40, said coil-specific energization data containing, inter alia, the current flow to be set in the stator coils 205 and information about which stator coils 205 are to be activated for an energization. The energization data 166 are transmitted via the data transmission medium 50 and the stator data line from the individual current division module 148 to the current sources 61 of the stator coils 205.

The coil-specific energization data 166 form the control data with which the current sources 61 of the energization device 60 are controlled. The current sources 61 regulate the coil currents flowing through the stator coils 205 to the coil current to be adjusted in accordance with the energization data 166.

Overall, the control system 100 forms by way of the position detection device 110, the data transmission medium 50, the position determining module 140, the positional control module 144, the current data generating module 146 and the individual current division module 148 a closed control loop designed to control the rotor position 154 to the predefined setpoint position.

The operating device 40 can be designed to execute control software comprising the individual modules used for the positional control of the rotor 20, that is to say the position determining module 140, the positional control module 144, the current data generating module 146 and the individual current division module 148 as software components, or as software modules or software elements. In this case, the operating device 40 can be embodied as an industrial PC or as a programmable logic controller.

The position detection device 110 can comprise a transmitter unit arranged on the rotor 20 and a signal detection unit arranged along the stator 200. In this case, the signal detection unit can be fixed to the stator 200 in a stationary fashion. By way of example, the signal detection unit can be fixed to the stator 200 by means of a nonreleasable connection, that is to say with a fixing that is releasable only destructively. In particular, the signal detection unit with the stator coils 205 can be potted in a housing of the stator 200. By way of example, such a position detection device 110 can be embodied as an inductive position detection device, as described in the document DE102012204917A1, inter alia.

In the case of an inductive position detection device, the signal detection unit comprises a plurality of signal detection coils arranged along the stator 200. The transmitter unit and the signal detection coils interact in such a way that when the rotor 20 is present in the vicinity of a signal detection coil, a differential voltage is dropped across the relevant signal detection coil. If the rotor 20 moves along the stator 200, this results in a sinusoidal or a cosinusoidal profile of the differential voltages.

If the position detection device 110 is an inductive position detection device, then the position detection device 110 is designed to transmit the differential voltages of the individual signal detection coils in the form of the position data 150 to the operating device 40. The position determining module 140 of the operating device 40 then determines the rotor position 154 from the differential voltages.

In an alternative embodiment, however, the rotor position 154 can also already be determined by a unit of the position detection device which is arranged on the stator 200. By way of example, such a unit can be the signal detection unit of an inductive position detection device. In such an embodiment, the position data 150 can also directly contain the rotor position 154.

The position detection device 110 can also be embodied as a magnetic or optical position detection device instead of as an inductive position detection device. All that is crucial is that the position detection device 110 has a signal detection unit which is arranged in a stationary fashion along the stator 200 and thus along the travel path of the rotor 20.

The drive 1 is designed to the effect that such movements of the rotor 20 which constitute a safety risk are safely prevented during the operation of the drive 1. Such a safety risk may reside for example in an endangerment of operating or maintenance personnel working on a machine comprising the drive 1. However, a safety risk may also reside in a movement of the rotor 20 that leads to damage of the drive 1 or a machine comprising the drive 1. This may be the case for example when the rotor 20 collides with a stop or a further machine part.

Safe operation of the drive 1 is made possible by virtue of the fact that the energization of the stator coils 205 with the AC current signal is safely monitored by the control system 100. In particular, it is ensured that the position of the rotor 20 that is detected by the position detection device 110 is compatible with the energization region and with the present phase angle of the AC current signal.

This makes use of the fact that, in the case of a linear motor, a force can be exerted on the rotor 20 by means of the stator coils 205 only if the AC current signal is tuned to the relative position of the rotor 20 in relation to the stator coils 205. In order to generate a force directed along the stator 200 on the rotor 20, at every point in time the spatial period of the magnetic field generated by the stator coils 205 must substantially match the spatial period of the arrangement of the drive magnets on the rotor 20. Furthermore, the magnetic field generated by the stator coils 205 must have a suitable offset in relation to the magnetic field generated by the drive magnets. Said offset corresponds to the load angle (also called pole wheel angle or commutation angle) of a rotary synchronous motor.

If the offset is such that the drive magnets and the magnetic field are in phase, then the force exerted on the rotor 20 acts substantially perpendicularly to the direction of motion of the rotor 20 and does not include a force component directed along the stator 200. If the magnetic field and the drive magnet arrangement are ninety degrees out of phase, then that force component of the force on the rotor 20 which is directed along the stator 200 is a maximum for a given amplitude of the AC current signal. If the rotor 20 moves along the stator 200, then a force directed along the stator 200 is exerted on the rotor 20 continuously only if the temporal frequency of the AC current signal is tuned to the speed of the rotor 20 along the stator 200.

Conversely, the position of the rotor 20 along the stator 200 can be derived from the energization of the stator coils 205, that is to say from the energization region and the phase angle of the AC current signal. In this case, the position of the rotor 20 along the stator 200 can already be estimated from the energization region alone, since the energization region only comprises stator coils 205 in the vicinity of the rotor 20. The accuracy with which the position of the rotor 20 can be estimated from the energization region results from the distance covered by the rotor 20 in each case between the displacements of the energization region in the direction of movement.

For a more accurate determination of the position of the rotor 20 from the AC current signal applied to the stator coils 205, the phase angle of the AC current signal is also used alongside the energization region. During a movement of the rotor 20, the energization region can be propagated along the stator 200 in such a way that, during a period of the AC current signal, one of the stator coils 205 enters the energization region and another of the stator coils 205 exits from the energization region. In this case, in particular, the position of the rotor 20 along the stator 200 can be deduced unambiguously from the energization region and the phase angle of the AC current signal applied to stator coils 205 within the energization region.

In order to check the compatibility of the energization of the stator coils 205 with the position of the rotor 20, the control system 100 comprises a coil monitoring device 120 and a safety device 130. The coil monitoring device 120 is arranged on the stator 200 and designed to monitor a status of the stator coils 205 and to transmit coil data 152 representing the status of the stator coils 205 via the data transmission medium 50 to the safety device 130.

In this case, the monitored status of one of the stator coils 205 can comprise the current flow or the coil current through the relevant stator coil 205. The monitored status can also comprise an activation state of the relevant stator coil 205. In this case, the activation state specifies whether the relevant stator coil 205 or the current source assigned to said stator coil is activated or enabled for an energization with the AC current signal.

If the monitored status of the stator coils 205 comprises the current flow through the stator coils 205 or the coil current in the stator coils 205, then the coil data 152 can comprise the current intensity of the coil currents through the stator coils 205. If the monitored status of the stator coils 205 comprises the activation state of the stator coils 205, then the coil data 152 can contain information about which of the stator coils 205 or which of the current sources 61 are enabled for an energization with the AC current signal. This information can be communicated for example as binary information in a suitable data bit of a data message comprising the coil data 152.

The monitored status of the stator coils 205 can also comprise both the current flow through the stator coils 205 and the activation state of the stator coils 205. In such a case, the coil data for each stator coil 205 comprise both the current intensity of the coil current flowing through the relevant stator coil 205 and the activation state of the relevant stator coil 205, for example in a manner coded in a data bit of the data message comprising the coil data 152.

The safety device 130 is designed to carry out a coordination between the coil data 152 and the position data 150. For this purpose, the safety device 130 comprises a position calculation module 132, which receives the coil data 152 and is designed to determine an energization position 156 from the coil data 152. In this case, the energization position 156 corresponds to the position of the rotor 20 that is derived from the status of the stator coils 205 communicated with the aid of the coil data 152.

If the coil data 152 comprise the coil currents of the stator coils 205 or the voltages dropped across the stator coils 205, then the position calculation module 132, for determining the energization position 156 from the coil data 152, can determine the energization region and the phase angle of the AC current signal and can determine therefrom the position of the rotor 20 or the energization position 156.

If the coil data 152 comprise the activation states of the stator coils 205, but not the coil currents through the stator coils 205 or the voltages dropped across the stator coils 205, then the position calculation module 132 determines the energization region from the activation states and the approximate position of the rotor 20 or the energization position 156 from the energization region. The coil data 152 can also comprise both the activation states and the coil currents or voltages dropped across the stator coils 205. In that case, the position calculation module 132 can firstly determine the energization region and the approximate position of the rotor 20 from the activation states and use the coil currents or voltages dropped across the stator coils for more accurately determining the position of the rotor 20.

The safety device 130 is furthermore designed, in the context of the coordination between coil data 152 and position data 150, to coordinate the energization position 156 with the rotor position 154 determined by the position determining module 140 of the operating device 40. For this purpose, the safety device 130 comprises a position comparison module 133. The position comparison module 133 is designed to determine a deviation between the energization position 156 and the rotor position 154. If the deviation exceeds a predefined maximum deviation, then this constitutes an error and the position comparison module 133 outputs an error message 170.

In this case, the magnitude of the maximum deviation takes into account, in particular, the uncertainty which can occur during the determination of the energization position 156 from the coil data 152. If the energization position 156 is determined only from the energization region, for example from the activation states of the stator coils 205, then said uncertainty is greater than in the case of a determination of the energization position 156 which additionally also takes account of the phase angle of the AC current signal.

If an error is discovered during the coordination between the coil data 152 and the position data 150, the safety device 130 causes the electric motor 10 of the drive 1 to be transferred to a safe state. For this purpose, the error message 170 is transmitted from the safety device 130 to an emergency shutdown module 137 of the operating device 40. The emergency shutdown module 137 is connected to an emergency shutdown apparatus 30 via a secure data connection. If the emergency shutdown module 137 receives the error message 170, it sends an emergency shutdown command 180 via the secure data connection to the emergency shutdown apparatus 30.

The emergency shutdown apparatus 30 is designed to carry out, on the basis of the emergency shutdown command 180, the transfer of the electric motor 10 to a safe state or the emergency shutdown of the electric motor 10. The safe state can consist, for example, in the fact that the stator coils 205 are no longer energized and the electric motor 10 of the drive 1 no longer exerts any force on the rotor 20. In this case, the emergency shutdown can be effected, for example, by virtue of the fact that the supply voltage present at the current sources 61 of the energization device 60 is certainly interrupted. Certainly interrupted means, in particular, that it is ensured that the interruption definitely takes place after the reception of the error message 170 and that the interruption remains until the emergency shutdown apparatus 30 is reset.

The emergency shutdown can also have the consequence, for example, that the electric motor 10 or the rotor 20 thereof is moved into a safe position, without the supply voltage present at the energization device 60 being interrupted. For this purpose, for example, the control program that controls the electric motor 10 in normal operation can be interrupted and the emergency shutdown apparatus 30 can be designed to control the rotor 20 of the electric motor 10 into the safe position.

The transfer of the electric motor 10 to a safe state or the emergency shutdown of the electric motor 10 can also be carried out by means of functions for stopping machine drive elements, such as are categorized in international and European standards.

If transferring the electric motor 10 to the safe state has the consequence that the stator coils 205 are no longer energized, the emergency shutdown apparatus 30 can for example be integrated into a central voltage supply device of the electric motor 10 or be embodied as a separate switching unit for interrupting a supply voltage line of the electric motor 10. The control system 100 can also have a stator control unit, which is arranged on the stator 200 and controls components of the drive 1 that are arranged on the stator 200. In this case, the emergency shutdown apparatus 30 can also be integrated into the stator control unit of the control system 100. In this case, the emergency shutdown apparatus 30 can be designed to interrupt the supply voltage only at a portion of the current sources 61 of the energization device 60. In this way, the safe state of the electric motor 10 can consist, for example, in the fact that a movement of the rotor 20 is no longer possible in a safety-critical area of the stator 200. Such a safety-critical area may be, for example, an area accessible to operating or maintenance personnel.

The components that are controlled by the stator control unit can be, for example, parts of the energization device 60, of the position detection device 110 or of the coil monitoring device 120. The stator control unit can be, for example, a microcontroller, a programmable logic controller or a field programmable gate array (FPGA).

In an alternative embodiment of the drive 1, the emergency shutdown module 137 can also be omitted and the emergency shutdown apparatus 30 can be designed to receive the error message 170 directly from the safety device 130. In this case, the emergency shutdown apparatus 30 carries out the emergency shutdown of the electric motor 10 after the reception of the error message 170.

The coil monitoring device 120 of the control system 100, said coil monitoring device being arranged on the stator 200, can comprise a plurality of monitoring elements 121, for example, wherein each stator coil 205 is assigned respectively one of the monitoring elements 121. If the monitoring elements 121 are designed to detect or to measure the coil current through the stator coil 205 assigned to them, the monitoring elements 121 can comprise for example a current transformer or a resistor through which current flows, which are connected in series for example with the assigned stator coil 205. In such a case, the monitoring elements 121 generate a current signal or a voltage signal that is proportional to the current flow through the monitoring element 121. Said current or voltage signal can be digitized by the coil monitoring device 120 and transmitted as coil data 152 to the safety device 130.

The coil monitoring device 120 having the monitoring elements 121 can also be embodied as part of the energization device 60. By way of example, the current sources 61 of the energization device 60, for regulating the current flow through the stator coils 205, can contain the monitoring elements 121 and regulate the current flow through the stator coils 205 on the basis of the signal of the monitoring elements 121.

Instead of the coil currents or the activation states, the monitored status of the stator coils 205 can also comprise the voltages dropped across the stator coils 205. In this case, the voltage dropped across one of the stator coils 205 is the sum of an induced voltage and the voltage that is necessary to maintain the coil current against the internal resistance of the stator coil. The induced voltage is that voltage which is induced by the excitation unit of the rotor 20 that moves along the stator coil 205.

The induced voltage is dropped across the stator coils 205 in particular even if the rotor 20 moves along the stator 200, without a force being exerted on the rotor 20 by the magnetic field of the stator coils 205, that is to say that the current flow through the stator coils 205 is actively regulated to zero. The voltage dropped across the stator coils 205 can be measured by the coil monitoring device 120 or by the monitoring elements 121 for example in each case via the two connections by means of which each of the stator coils 205 is respectively connected to its assigned current source 61.

If the current sources 61 generate the coil currents through the stator coils 205 by means of a pulse width modulation, the voltage present at the stator coils 205 can also be determined by way of the duty cycle or the duty factor of the pulse width modulation. In this case, the voltage across the stator coils 205 does not have to be measured directly in order to obtain the coil data 152. The monitoring elements 121 of the coil monitoring device 120 can also evaluate and transmit in each case the duty cycle of the pulse-width-modulated signal present at the respective stator coils 205.

The transmission of the coil data 152 from the coil monitoring device 120 via the data transmission medium 50 to the operating device 40 is carried out via a secure data transmission channel 56. The secure data transmission channel 56 is designed to securely identify transmission errors during the transmission of the coil data 152. By way of example, the secure data transmission channel 56 can be realized by means of a secure data transmission protocol. Particularly if the data transmission medium 50 is an Ethernet connection, the FailSafe-over-EtherCAT (FSoE) or Safety-over-EtherCAT protocol can be used as the secure data transmission protocol.

During the transmission of data via the secure data transmission channel 56, an identification of transmission errors can be made possible, for example, by transmitted data packets being provided with a checksum, a sequential number or a connection identification number. The checksum allows the data integrity of the data packet to be checked, while the sequential number makes it possible to differentiate for example repeated sending of identical data packets from sending of different data packets having an identical content. An incorrect forwarding of a data packet, for example to an incorrect receiver, can be identified by means of the connection identification number. In addition, time monitoring can be used during the data monitoring, by means of which time monitoring a loss or a delay of a data packet can be identified.

The data transmission medium 50 and the data transmission protocols used for the data transmission via the data transmission medium 50 are designed to the effect that both the secure data transmission channel 56 for transmitting the coil data 152 and a non-safeguarded data transmission channel 52 for transmitting the position data 150 can be realized via the data transmission medium 50. This is the case for example for a data transmission medium 50 based on Ethernet technology and for the use of the EtherCAT protocol in combination with the FailSafe-over-EtherCAT protocol. In this case, by means of the FailSafe-over-EtherCAT protocol, a safeguarded EtherCAT data channel is made available as a secure data transmission channel 56 for transmitting safety-relevant data, for example the coil data 152.

The transmission of the energization data 166 from the operating device 40 to the energization device 60 arranged on the stator 200 can likewise be carried out via a non-safeguarded data transmission channel of the data transmission medium 50. The secure data connection for transmitting the emergency shutdown command 180 to the emergency shutdown apparatus 30 can be embodied as a further secure data transmission channel 57, which is embodied like the secure data transmission channel 56. The further secure data transmission channel 57 can likewise be realized via the data transmission medium 50.

In alternative embodiments of the drive 1, the data channels for transmitting the coil data 152, the position data 150, the coil-specific energization data 166 and the emergency shutdown command 180 can also be realized via separate data transmission media. All that is crucial is that at least the transmission of the coil data 152 and of the emergency shutdown command 180 is carried out via secure data transmission channels 56, 57.

The safety device 130 is embodied by means of safe functional components of the control system 100. As a result, the safety device 130 can be embodied completely or partly as safe software on the operating device 40. The safe functional components make it possible to form safely executable program parts of control software of the control system 100. The safely executable program parts are distinguished, inter alia, by a safeguarded, for example redundant, calculation of output parameters and a safeguarded transmission of the input and output parameters between the individual functional components. The safeguarded transmission can be realized for example in a manner similar to that in the case of the secure data transmission channel 56 by means of additional checksums, sequential numbers or connection identification numbers. The modules of the control system 100 that are embodied by means of safe functional components form a safety function region 138 of the control system 100.

Alongside the safety device 130, the emergency shutdown module 137 is also embodied by means of safe functional components. Furthermore, a controller of the emergency shutdown apparatus 30 can also be embodied wholly or partly by means of safe functional components. The possibility of setting up secure data transmission channels via the data transmission medium 50 or further data transmission media of the control system 100 makes it possible for each of the individual modules 132, 133, 137 of the safety device 130 that are embodied by means of safe functional components also to be embodied in a distributed fashion in different components of the control system 100. By way of example, the position calculation module 132 can be embodied completely or partly in the energization device 60 or in a stator control unit arranged on the stator 200. In such a case, the coil data 152 would already comprise the energization position 156 determined by the position calculation module 132. Moreover, for example, the emergency shutdown module 137 can be embodied completely or partly in the emergency shutdown apparatus 30. In this case, the secure data transmission channels 56, 57 ensure the error-free transmission of the input and output parameters between the modules or between individual parts of the modules.

If the control system 100 comprises one or a plurality of stator control units arranged on the stator 200, then the individual current division module 148 can also be embodied in the stator control unit or the stator control units. In such a case, rather than the control data for controlling the current sources 61, the rotor-specific current data 164 would be transmitted via the data transmission medium 50 to the stator 200 and the stator control unit. In such a case, the setpoint coil data 192 could be calculated for example in parallel by a further individual current division module embodied in the operating device 40.

The coordination between the position data 150 and the coil data 152 that is carried out by means of the position determining module 140, the position calculation module 132 and the position comparison module 133 enables a two-channel validation of the energization of the stator 200 of the drive 1. In this case, two position information items detected independently of one another at the stator 200, transmitted independently of one another via the data transmission medium 50 to the operating device 40 and calculated independently of one another are coordinated relative to one another.

In this case, the coordination is performed in the safety function region 138 of the control system 100 with the aid of safe functional components. Therefore, the correctness of the coil data 152 and of the position data 150 can be taken as a basis for a further safety consideration of the operating state of the drive 1 if it is discovered in the context of the coordination that the energization position 156 determined from the coil data 152 is compatible with the rotor position 154 determined from the position data 150. In particular, in this case a redundantly plausibilized energization position or rotor position is present in the safety device 130 of the control system 100.

The transmission of the coil data 152 via the secure data transmission channel 56 allows the position data 150 and the coil data 152 to be transmitted jointly via the data transmission medium 50. In this case, the secure data transmission channel 56 makes it possible to discover errors having a common cause during the data transmission via the data transmission medium 50, which errors would not be identified in the case of an insecure transmission both of the position data 150 and of the coil data 152.

Figure 2:
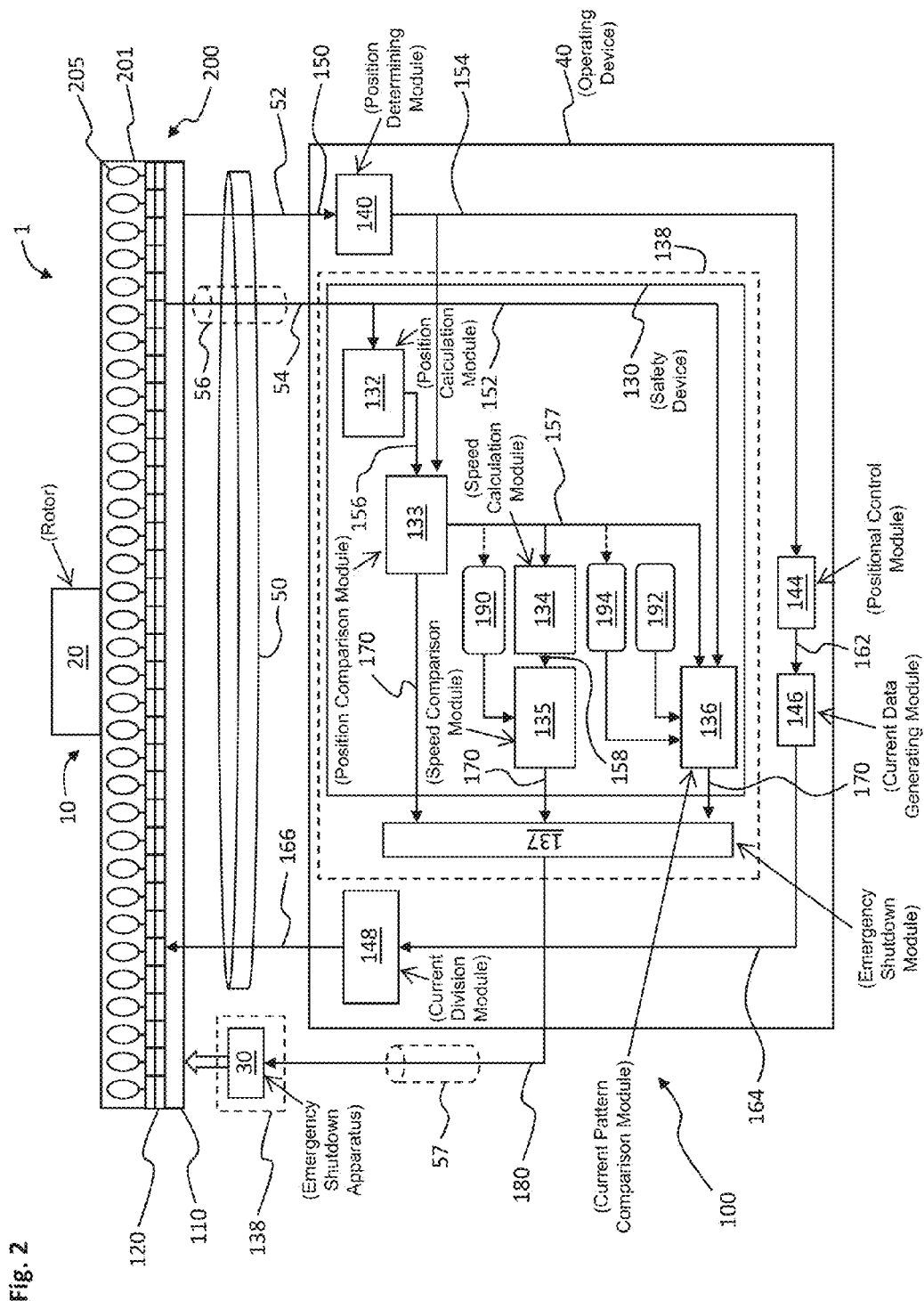
FIG. 2 shows a further schematic illustration of the drive.

If no error was discovered during the coordination between the coil data 152 and the position data 150, it is possible, on the basis of the validated rotor position 154 and the validated coil data 152, for further safety-relevant operating parameters of the drive 1 to be checked by the safety device 130 and for the electric motor 10 to be transferred to a safe state in the event of an error being discovered. For this purpose, the safety device 130 comprises, as illustrated in FIG. 2, a speed calculation module 134, a speed comparison module 135 and a current pattern comparison module 136.

In order to enable a monitoring of further safety-relevant operating parameters of the drive 1, the position comparison module 133 is designed to output a secured rotor position 157 if no error has been discovered during the coordination between the position data 150 and the coil data 152. If an error was discovered during the coordination between the position data 150 and the coil data 152, then the position comparison module 133 has already caused the drive 1 to be transferred to a safe state. In this case, the steps for monitoring further safety-relevant operating parameters of the drive 1 are not carried out.

The secured rotor position 157 can be for example the rotor position 154 determined from the position data 150 by the position determining module 140 or the energization position 156 determined from the coil data 152 by the position calculation module 132. Particularly if the coil data 152 only comprise the activation states of the stator coils 205, a determination of the secured rotor position 157 from the rotor position 154 is more accurate than a determination of the secured rotor position 157 from the energization position 156.

The secured rotor position 157 is forwarded to the speed calculation module 134 of the safety device 130. The speed calculation module 134 calculates a speed 158 of the movement of the rotor 20 along the stator 205 from a temporal variation of the secured rotor position 157. Depending on whether the secured rotor position 157 was determined from the rotor position 154 or from the energization position 156, the speed calculation module 134 therefore calculates the speed 158 on the basis of the position data 150 or on the basis of the coil data 152.

The speed 158 is communicated to the speed comparison module 135 of the safety device 130, which speed comparison module compares the speed 158 of the rotor 20 with a predefined setpoint speed 190 in the context of the coordination between the coil data 152 and the position data 150. If an error is discovered during the comparison between the speed 158 and the setpoint speed 190, then the error message 170 transmitted from the safety device 130 to the emergency shutdown module 137 is initiated by the speed comparison module 135.

The error discovered during the comparison between the speed 158 and the setpoint speed 190 can consist in the speed 158 exceeding the setpoint speed 190. In this case, the setpoint speed 190 represents a maximum speed of the rotor 20. The error discovered during the comparison between the speed 158 and the setpoint speed 190 can also consist in the speed 158 falling below the setpoint speed 190. In this case, the setpoint speed 190 represents a minimum speed of the rotor 20. Alongside the setpoint speed 190, even further setpoint speeds can be predefined. By way of example, both an exceedance of a maximum speed and an undershooting of a minimum speed can be monitored by the speed comparison module 135. It is thereby possible for example to monitor that the rotor 20 complies with a safe speed range.

The predefined setpoint speed 190 can have a defined value during the operation of the drive 1 and cannot change during operation. However, the predefined setpoint speed 190 can also be dependent on the position of the rotor 20. In this case, it is possible to define a first position region along the stator 200, in which a first predefined setpoint speed is intended not to be exceeded or undershot during safe operation of the drive 1. Furthermore, it is possible to predefine a second position region along the stator 200, in which either a second predefined setpoint speed is intended not to be exceeded or undershot, or in which the movement of the rotor 20 is not coordinated relative to a setpoint speed.

If the predefined speed 190 is dependent on the position of the rotor 20, then that value of the predefined setpoint speed 190 which is to be used for the coordination is determined on the basis of the secured rotor position 157. Since the comparison between the speed 158 and the setpoint speed 190 is only carried out if an error has not been discovered during the coordination between the coil data 152 and the position data 150, the secured rotor position 157 is unambiguously defined.

The predefined setpoint speed 190 can also be dependent on other operating parameters of the drive 1 or other parameters of the movement of the rotor 20. By way of example, the value of the predefined setpoint speed 190 can be dependent on a loading of the rotor 20 with a payload or a presence of a person in the vicinity of a machine comprising the drive 1. In such cases, by means of a situation-adapted predefinition of the setpoint speed 190, safe operation of the drive 1 can be ensured in specific operating states that make increased requirements of machine safety, while a movement of the rotor 20 with unrestricted speed is made possible in other operating states with less stringent requirements made of safety.

The current pattern comparison module 136 of the control system 100 is designed to compare the coil data 152 with predefined setpoint coil data 192 in the context of the coordination between the position data 150 and the coil data 152. For this purpose, the coil data 152 transmitted via the secure data transmission channel 56 are forwarded to the current pattern comparison module 136. The setpoint coil data 192 can be obtained from the coil-specific energization data 166, for example, which are transmitted to the energization device 60 for the purpose of the energization of the individual stator coils 205. However, the setpoint coil data 192 can also be derived from the rotor-specific current data 164, in a manner analogous to that as described in association with the individual current division module 148. The manner in which the setpoint coil data 192 are obtained is not illustrated in the simplified schematic block diagram in FIG. 2.

The setpoint coil data 192 comprise information about how the individual stator coils 205 are to be energized on the basis of the stipulations of the positional control module 144 and of the current data generating module 146, and if appropriate on the basis of stipulations of a superordinate control device of the drive 1. By way of example, the setpoint coil data 192 can specify in each case which of the stator coils 205 are to be activated for an energization and what coil current is to be adjusted in each case in the activated stator coils 205 by means of the current sources 61.

The comparison of the coil data 152 transmitted from the coil monitoring device 120 to the operating device 40 with the setpoint coil data 192 makes it possible for the safety device 130 to certainly identify or discover errors during the energization of the stator coils 205, for example during the generation of the coil currents. In order to realize a secured monitoring of the energization of the stator coils 205, the comparison of the coil data 152 with the setpoint coil data 192 is carried out only if the position comparison module 133 has validated the coil data 152 by means of the position data 150, by virtue of said position comparison module having compared the energization position 156 with the rotor position 154.

If an error is discovered by the current pattern comparison module 136 during the comparison of the coil data 152 with the setpoint coil data 192, the current pattern comparison module 136 initiates the error message 170 communicated from the safety device 130 to the emergency shutdown module 137, whereupon the emergency shutdown module 137 instigates an emergency shutdown of the electric motor 10.

The error discovered during the comparison of the coil data 152 with the setpoint coil data 192 may consist for example in the fact that the current flow—communicated in the coil data 152—in one or in a plurality of the stator coils 205 does not match a current flow predefined by the setpoint coil data 192. The error can for example also consist in the fact that the activation state of one of the stator coils 205 does not match an activation state predefined by the setpoint coil data 192.

The current pattern comparison module 136 is furthermore designed to determine a force on the rotor 20 on the basis of the coil data 152. For this purpose, the current pattern comparison module 136 also receives the secured rotor position 157 from the position comparison module 133 alongside the coil data 152. The force on the rotor 20 results from the coil currents through the stator coils 205 and the relative position between the stator coils 205 and the drive magnets of the rotor 20. By means of suitable transformations of the coil currents into a coordinate system concomitantly moved along the stator, analogously to the Park transformation in the case of three-phase drive systems, a torque-forming and a flux-forming current component of the AC current signal can be determined. In this case, the torque-forming current component determines the force acting on the rotor 20 along the stator 200. The current pattern comparison module 136 determines the force on the rotor 20 from the secured rotor position 157 and the coil data 152, after the coil data 152 and the position data 150 have been coordinated relative to one another.

In the context of monitoring safe operation of the electric motor 10 or of the drive 1, it may be necessary to determine the force on the rotor 20 from certainly determined current flows through the stator coils 205. A coordination of the coil data 152 with the position data 150 may not be sufficient for this purpose. By way of example, an energization that is carried out per se at the correct position with the correct phase angles, but with an incorrect amplitude of the AC current signal, cannot be identified certainly by means of a coordination between the coil data 152 and the position data 150. Therefore, for a certain determination of the current flows for calculating the torque-forming current components and thus the force acting on the rotor 20, the coil data 152 can additionally be compared with the setpoint values— contained in the setpoint coil data 192—for the coil currents or for the voltages dropped across the stator coils. Moreover, the monitoring of the status of the stator coils 205 can comprise a further, redundant determination of the coil data 152. By way of example, a two-channel measurement of the coil currents or of the voltages dropped across the coils can be carried out.

The current pattern comparison module 136 is additionally designed to compare the force on the rotor 20 with a predefined setpoint force 194. If an error is discovered in this case, then the current pattern comparison module 136 communicates the error message 170 to the emergency shutdown module 137 in order to cause the electric motor 10 to be transferred to a safe state. In this case, the error discovered during the comparison between the force on the rotor 20 and the setpoint force 194 can comprise the setpoint force 194 being exceeded by the force on the rotor 20, such that the setpoint force 194 represents a maximum force on the rotor 20. The error can likewise comprise the setpoint force 194 being undershot by the force on the rotor 20, such that the setpoint force 194 represents a minimum force on the rotor 20.

The predefinition of a maximum force allows the force exerted on the rotor 20 to be restricted, for example in order to preclude an endangerment of persons in the vicinity of a machine comprising the drive 1. If a minimum force on the rotor is necessary for a safe operating state of the machine comprising the drive 1, for instance in order to raise a machine part fixed to the rotor, then safe operation of the drive 1 is made possible by the predefinition of a minimum force on the rotor 20. Depending on the configuration of the machine comprising the drive 1, a minimum force not to be undershot and a maximum force not to be exceeded can also be predefined simultaneously.

Like the setpoint speed 190, the predefined setpoint force 194 can be dependent on the position of the rotor 20 along the stator 200. This makes it possible to define one or a plurality of safety-critical areas along the stator 200 in which it is necessary to comply with maximum or minimum forces for safe operation of the drive 1. In other areas, either compliance with other maximum or minimum forces can be monitored or a basically unlimited force on the rotor 20 can be permitted. As in the comparison of the speed 158 with the setpoint speed 190, the secured rotor position 157 is used to define what value of the setpoint force 194 is intended to be used for the comparison with the force on the rotor 20.

The current pattern comparison module 136, the speed comparison module 135 and the speed determining module 134 are embodied as parts of the safety function region 138 and are realized by means of safe functional components as safely executable program parts of the control system 130, as described in association with the position calculation module 132 and the position comparison module 133. In particular, input and output parameters of the modules 134, 135, 136, such as, for example, the secured rotor position 157, the coil data 152, the setpoint speed 190, the setpoint coil data 192 and the setpoint force 194, are transmitted in a safeguarded manner between the individual modules of the safety device 130 of the control system 100.

Figure 3:
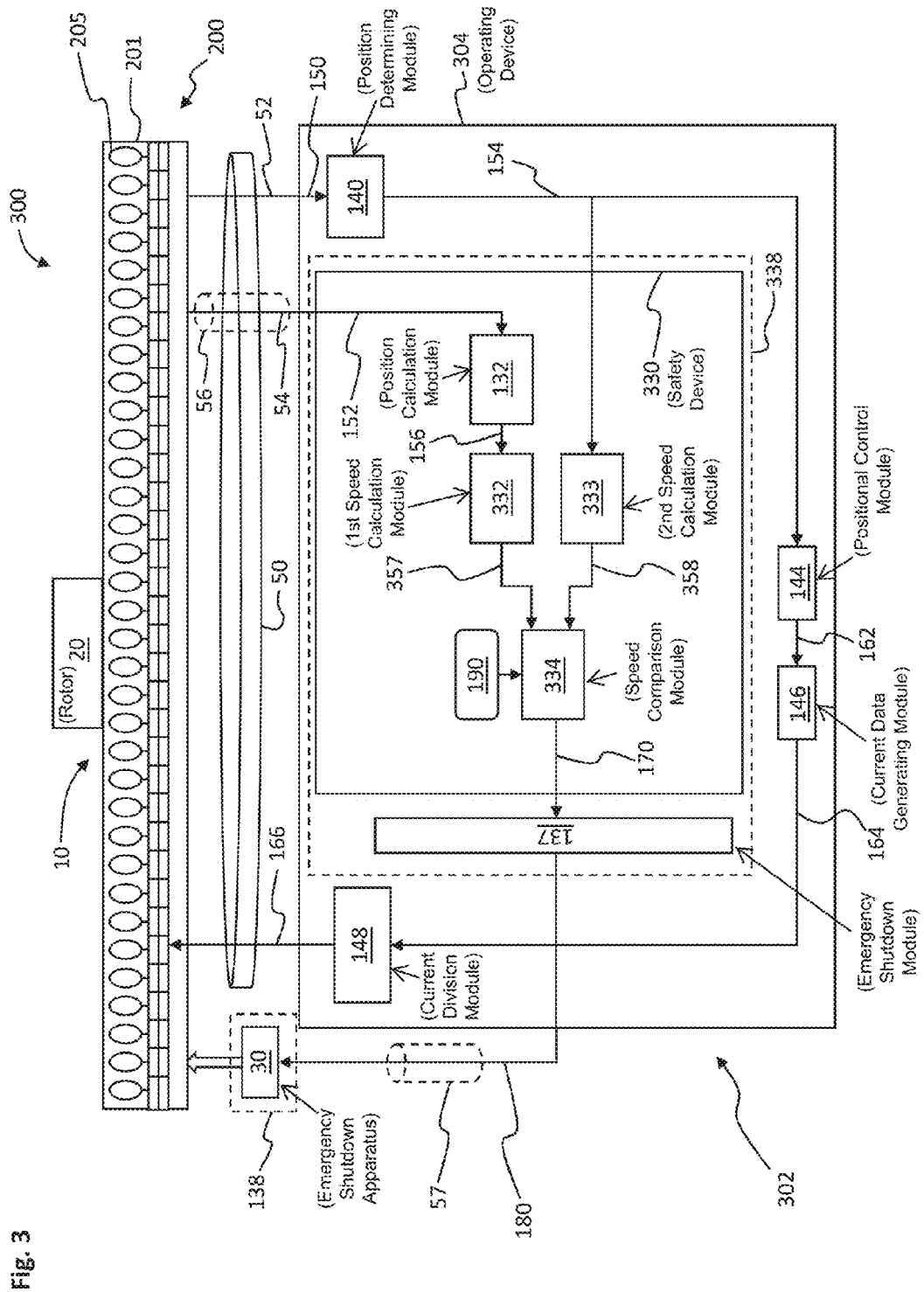
FIG. 3 shows a schematic illustration of a drive having an electric motor and a control system comprising a safety device.

FIG. 3 shows a schematic illustration of a drive 300. In so far as no differences are described below, the drive 300 is embodied like the drive 1 illustrated in FIGS. 1 and 2. Components which are embodied identically or in an identically acting way in the case of the drive 1 and the drive 300 are provided with the same reference signs in FIGS. 1, 2 and 3. Alongside the electric motor 10, the drive 300 comprises a control system 302 having a safety device 330. In so far as nothing to the contrary is described below, the control system 302 and the safety device 330 are embodied like the control system 100 and the safety device 130, respectively, of the drive 1.

In particular, the safety device 330 is designed to carry out a coordination between the position data 150 and the coil data 152. Like the safety device 130, the safety device 330 comprises for this purpose the position calculation module 132, which calculates the energization position 156. The position calculation module 132 is embodied on an operating device 304 of the control system 302, wherein the operating device 304, in so far as no differences are described below, is embodied like the operating device 40 of the control system 100. The operating device 304, like the operating device 40, is designed to implement the position determining module 140 in order to determine the rotor position 154.

In contrast to the safety device 130, the safety device 330 is designed to carry out the coordination between the position data 150 and the coil data 152 not on the basis of the energization position 156 and the rotor position 154, but rather on the basis of two speed information items determined independently of one another. The safety device 330 calculates a first speed information item 357 from the energization position 156, for which purpose the energization position 156 is forwarded from the position calculation module 132 to a first speed calculation module 332 of the safety device 330.

The first speed calculation module 332 is embodied like the speed calculation module 134 of the safety device 130, but receives the energization position 156 instead of the secured rotor position 157. On the basis of a change in the energization position 156 over time, the first speed calculation module 332 determines a speed of the movement of the rotor 20 along the stator 200, which represents the first speed information item 357.

A second speed information item 358 is determined from the rotor position 154 by a second speed calculation module 333 of the safety device 330. The second speed calculation module 333 is embodied like the first speed calculation module 134 and the second speed calculation module 332, but receives the rotor position 154. On the basis of a change in the rotor position 154 over time, the second speed calculation module 333 determines a speed of the movement of the rotor 20 along the stator 200, which represents the second speed information item 358.

The safety device 330 is furthermore designed to transmit the first speed information item 357 from the first speed calculation module 332 and the second speed information item 358 from the second speed calculation module 333 to a speed comparison module 334 of the safety device 330. The speed comparison module 334, in the context of the coordination between the position data 150 and the energization data 152, compares the first speed information item 357 with the second speed information item 358 and, in the case of an impermissible deviation of the first speed information item 357 from the second speed information item 358, generates the error message 170 to be transmitted to the emergency shutdown module 137, in order to cause the electric motor 10 to be transferred to a safe state.

In this case, as in the case of the comparison of the rotor position 154 with the energization position 156 by means of the position comparison module 133, the magnitude of the permissible deviation between the first speed information item 357 and the second speed information item 358 can take into account in each case the uncertainty which can occur in each case during the determination of the first speed information item 357 and of the second speed information item 358 from the energization position 156 and from the rotor position 154, respectively. It is likewise possible to take account of the uncertainty which can occur during the determination of the energization position 156 from the coil data 152 or during the determination of the rotor position 154 from the position data 150.

Like the speed comparison module 135, the speed comparison module 334 is also designed to carry out a comparison with the predefined setpoint speed 190. In this case, the speed comparison module 334 compares the first speed information item 357 and/or the second speed information item 358 with the predefined, possibly position-dependent, setpoint speed 190. As described in association with the speed comparison module 135, the speed comparison module 334, in the case of an impermissible deviation of the first speed information item 357 or the second speed information item 358, transmits the error message 170 to the emergency shutdown module 137 in order to cause the electric motor 10 to be transferred to a safe state.

The position calculation module 132, the first speed calculation module 357, the second speed calculation module 358 and the speed comparison module 334 of the safety device 330 are embodied as part of a safety function region 338 of the control system 302. In so far as no deviations are described, the safety function region 338 is embodied like the safety function region 138 of the control system 100. In particular, the modules of the safety function region 338 are embodied by means of safe functional components.

Since the calculation of the first speed information item 357 and of the second speed information item 358 from the coil data 152 and the rotor position 154, and also the comparison between the first speed information item 357 and the second speed information item 358 are performed in the safety function region 338, in the case where the first speed information item 357 matches the second speed information item 358, the correctness of the position data 150 and the coil data 152 can be assumed in the context of a safety consideration of the drive 1. A match between the first speed information item 357 and the second speed information item 358 thus validates the coil data 152 and the position data 150.

On the basis of the coordination between the coil data 152 and the position data 150, further operating parameters of the drive 300 can be checked by the safety device 330 of the control system 302, in a manner analogous to that as explained in association with the safety device 130 of the drive 1. In particular, in the case where the first speed information item 357 matches the second speed information item 358, the coil data 152 can be coordinated with setpoint coil data. Likewise, the force on the rotor 20 can be determined from the coil data 152 and said force can be compared with a predefined, if appropriate position-dependent, setpoint force.

The possibility of setting up secure data transmission channels via the data transmission medium 50 makes it possible, in alternative embodiments of the drive 300, to arrange individual modules of the safety function region 338 of the control system 302 on the stator 200 of the electric motor 10. By way of example, the speed comparison module 334 and the emergency shutdown module 137 can be arranged on the stator 200. The speed comparison module 334 and the emergency shutdown module 137 can be implemented for example in a stator control unit arranged on the stator 200. In such a case, the speed information items 357, 358 calculated in the operating device 304 can be transmitted via the data transmission medium 50 with the aid of one or a plurality of secure data transmission channels to the speed comparison module 334 and the emergency shutdown module 137.

Figure 4:
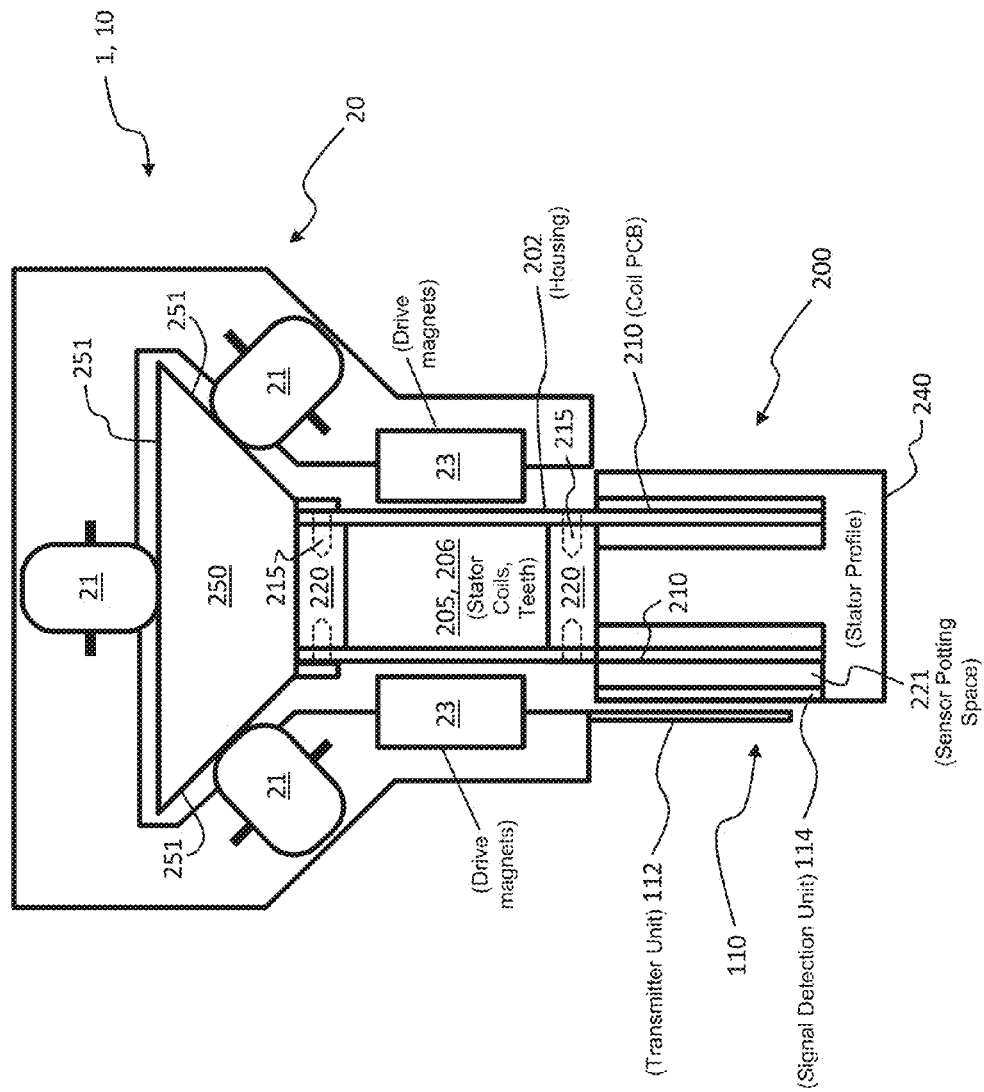
FIG. 4 shows a frontal cross-sectional view of the electric motor of the drive.

FIG. 4 shows a frontal cross-sectional view of the electric motor 10 of the drives 1,300 in a section through the stator 200 and through the rotor 20 movable along the latter. The embodiment of the stator 200 substantially corresponds to an embodiment disclosed in the document DE102012204917A1.

The stator 200 comprises two coil printed circuit boards 210 arranged parallel to one another and opposite one another along the stator 200, said coil printed circuit boards being illustrated in each case in cross section in FIG. 4. The stator coils 205 are arranged between the coil printed circuit boards 210, wherein in FIG. 4 one of the stator coils 205 is visible and the rest of the stator coils 205 are arranged behind or in front of the stator coil 205 illustrated. Moreover, FIG. 4 only illustrates one stator tooth 206 of the stator coil 205, said stator tooth forming a coil core of the stator coil 205. A coil winding of the stator coil 205, which consists of a wire wound around the coil core, is not illustrated in FIG. 4.

An interspace between the coil printed circuit boards 210 is delimited on one side by a guide element 250 of the stator 200, to which the coil printed circuit boards 210 are connected. On the other side, the interspace between the coil printed circuit boards 210 is delimited by a stator profile 240, to which the coil printed circuit boards 210 are likewise connected. By way of example, the coil printed circuit boards 210 can in each case be screwed to the guide element 250 and the stator profile 240. Instead of being connected to the guide element 250, the coil printed circuit boards 210 can also be connected to a further stator profile, on which a suitable guide for the rotor can be fitted.

The coil printed circuit boards 210 are substantially free of ferromagnetic constituents and can comprise for example a plastic, for instance a glass-fiber-reinforced epoxy resin, or a ceramic material. A part of the interspace between the coil printed circuit boards 210 forms a coil potting space 220, which is potted with a potting compound. The potting compound likewise comprises a plastic material, for example an epoxy resin. As a result of the coil potting space 220 being filled with the potting compound, the stator coils 205 and the two coil printed circuit boards 210 are fixed in their relative position with respect to one another.

The guide element 250 is designed to guide the rotor 20 along the stator 200. The guide element 250 is embodied as a guide rail having running surfaces 251 and has a total of four side surfaces and a trapezoidal cross section. One side surface of the guide rail is arranged in a manner facing the coil potting space 220, and the running surfaces 251 are formed on the other three side surfaces. The guide element 250 is screwed to the coil printed circuit boards 210 by means of screws 215.

In alternative embodiments of the stator 200, the guide rail can also have a cross section that deviates from the illustration in FIG. 4. By way of example, the guide rail can be embodied substantially as a double-T carrier having two transverse pieces that are trapezoidal in cross section.

The rotor 20 has a substantially U-shaped cross section. Two limbs of the rotor 20 from a side of the guide element 250 facing away from the coil potting space, enclose the guide element 250 and the coil potting space 220 with the stator coils 205 arranged therein. The rotor 20 comprises rollers 21, arranged on the rotor 20 in such a way that they can roll on the running surfaces 251. FIG. 4 illustrates three of the rollers 21, wherein respectively one of the rollers 21 illustrated rolls on one of the running surfaces 251. The rotor 20 can have further rollers 21, which can be arranged for example behind or in front of the rollers 21 depicted. The rotor 20 can also engage with the guide element 250 by means of ball bearings or sliding rails, instead of by means of the rollers 21.

The rotor 20 has drive magnets 23 arranged on side surfaces of the rotor 20 that face the stator coils 205. The drive magnets 23 form the excitation unit of the electric motor 10. FIG. 4 illustrates two of the drive magnets 23; further drive magnets 23 are arranged in front of and behind the illustrated drive magnets 23 in the running direction.

A transmitter unit 112 of the position detection device 110 of the control system 100 is arranged at the end of one limb of the substantially U-shaped rotor 20. The transmitter unit 112 comprises a printed circuit board, illustrated in cross section in FIG. 4. A signal detection unit 114 of the position detection device 110 is arranged on a side surface of the stator 200 that faces the transmitter unit 112. The signal detection device 114 likewise comprises a printed circuit board, which is aligned parallel to the printed circuit board of the transmitter unit 112 and is arranged along the stator 200.

In the case of an inductive position detection device 110, the signal detection unit 114 comprises conductor loops arranged on the printed circuit board of the signal detection device 114 and along the stator 200. In the case where the transmitter unit 112 arranged on the rotor 20 is present in the vicinity of such a conductor loop, a differential voltage is induced in the relevant conductor loop, which differential voltage can be detected by means of read-out electronics arranged on the printed circuit board of the signal detection device and can be transmitted by means of the position data 150 to the operating devices 40, 304 of the drives 1, 300. For this purpose, the transmitter unit 112 can comprise metallic conductor strips, for example.

The printed circuit board of the signal detection unit 114 is screwed to the stator profile 240. A sensor potting space 221 is situated between the printed circuit board of the signal detection unit 114 and one of the coil printed circuit boards 210. By way of example, read-out electronics of the signal detection unit 114 can be arranged in the sensor potting space 221. The sensor potting space 221 is potted, like the coil potting space 220. This has the consequence that the position of the signal detection unit 114 is fixed relative to the coil printed circuit boards 210 and thus also relative to the stator coils 205. The signal detection unit 114 and the stator coils 205 are thus arranged in a stationary fashion with respect to one another in the stator 200. A nonreleasable connection, or a connection that is releasable only destructively, between the stator coils 205 and the signal detection unit 114 of the position detection device 110 is realized by means of the potting of the sensor potting space 221 and of the coil potting space 220.

The coil printed circuit boards 210, the printed circuit board of the signal detection unit 114, the guide element 250 and the stator profile 240 form the outer surfaces of a housing 202 of the stator 200. Electronic components of the drive 1 can be arranged within the housing 202, for example the energization device 60 having the current sources 61 for energizing the stator coils 205, the coil monitoring device 120 or the read-out electronics for reading the conductor loops of the signal detection unit 114. Partly or completely, these components can also be integrated in a stator control unit arranged within the housing 202. Like the coil potting space 220 and the sensor potting space 221, further cavities within the housing 202 of the stator 200 can be potted with a potting compound in order to increase the mechanical stability or the thermal conductivity of the housing 202.

Figure 5:
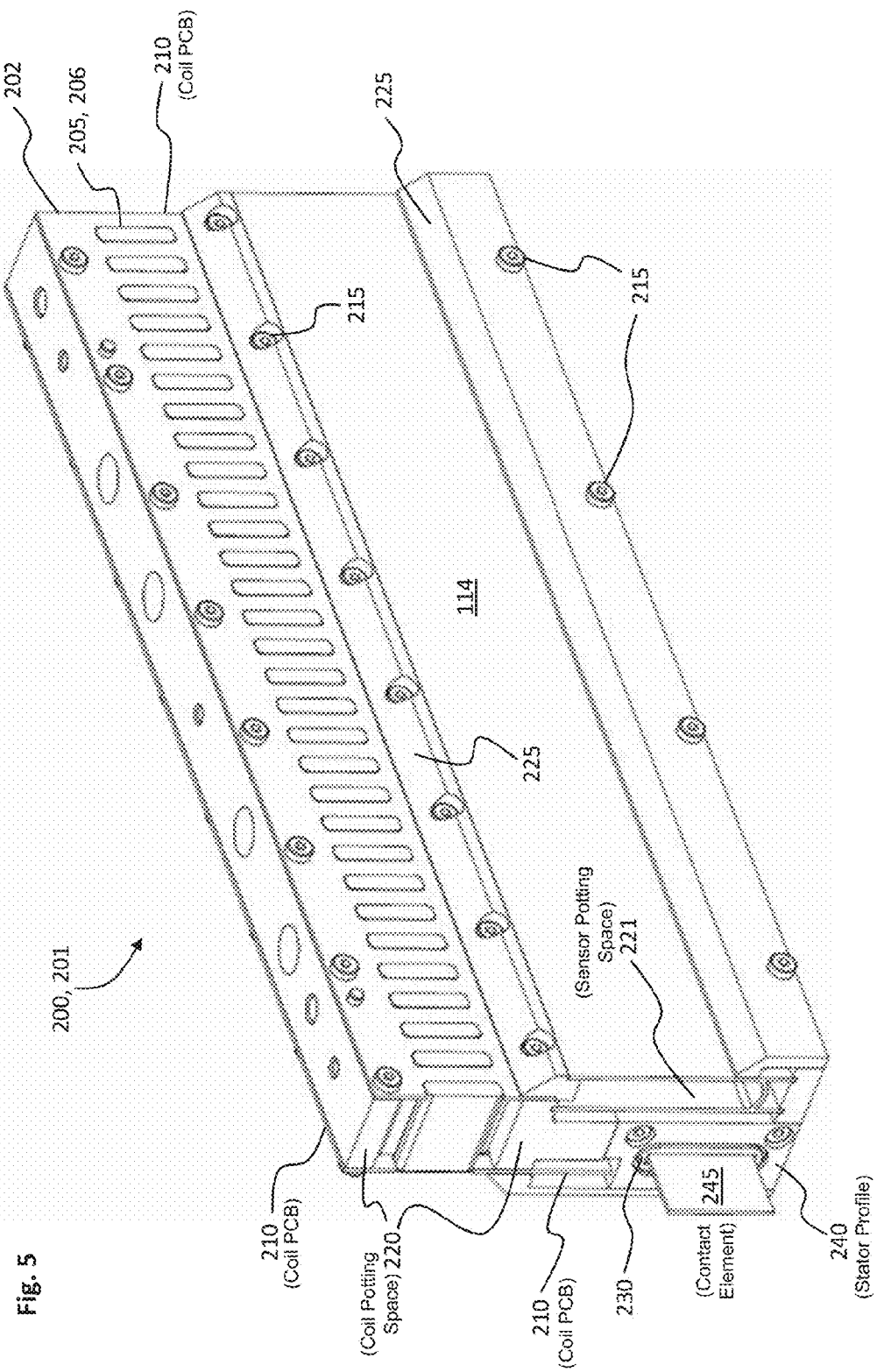
FIG. 5 shows a perspective view of a stator of the electric motor.

FIG. 5 shows a three-dimensional schematic illustration of the stator 200 illustrated in cross section in FIG. 4. The stator 200 is composed of a plurality of individual stator modules 201, and the excerpt from the stator 200 as illustrated in FIG. 5 shows one of the stator modules 201. In order to simplify the illustration, the guide element 250 and the rotor 20 are not illustrated in FIG. 5.

FIG. 5 shows a plurality of the stator teeth 206. The stator teeth 206 are embodied in a rod-shaped fashion. They are arranged in a manner aligned transversely with respect to the coil printed circuit boards 210 and parallel to one another and spaced apart from one another between the coil printed circuit boards 210. As described in connection with FIG. 6, every second one of the stator teeth 206 has wound around it in each case a coil winding and forms a coil core of one of the stator coils 205 of the stator 200. In each case one of the two ends of the stator teeth 206 is arranged in each case in a cutout in the coil printed circuit boards 210, such that the ends of the coil teeth 206 terminate flush with a respective outer surface of the coil printed circuit boards 210.

In order to fix the signal detection unit 114 to the stator module 201 in a stationary fashion, the signal detection unit 114 is fitted to the stator module 201 by means of two fixing rails 225 in addition to the connection imparted by the potting compound in the sensor potting space 221. The fixing rails 225 are in each case screwed to the stator 200 by means of screws 215. However, the fixing rails 225 can also be connected to the stator 200 by means of an adhesive connection or a clamping connection.

The stator module 201 is designed to be connected in each case to a further stator module, embodied identically, at the end sides. As a result, a plurality of the stator modules 201 can be arranged adjacently to one another seamlessly along the stator 200. At the two end sides, the stator module 201 has in each case a connection socket 230 that can be used for electrically contacting a stator module 201 arranged adjacent. In this case, the electrical connection is produced with the aid of a contact element 245. The contact element 245 is arranged in the connection sockets 230 of the two adjacent stator modules 201, where it makes contact in each case with electrical contacts of the stator modules 201. The contact element 245 can be embodied for example as a printed circuit board having electrically conductive conductor tracks exposed on the surface.

The electrical connection between stator modules 201 via the contact element 245 can form a part of the stator data line, for example. In this regard, for example, control data can be transmitted between current sources 61 arranged in adjacent stator modules 201. Moreover, the position data 150 and the coil data 152 can be transmitted from one of the stator modules 201 to an adjacent stator module with the aid of the contact element 245. Furthermore, the supply voltage of the current sources 61 can be transmitted from one of the stator modules 201 to an adjacent stator module via the contact element 245.

If the stator 200 is composed of a plurality of the stator modules 201, the control system 100 can comprise a plurality of stator control units, wherein a respective stator control unit is arranged in each of the stator modules 201. The components of the control system 100 which are arranged on the stator 200 are then connected via the stator control units to the stator data line and via the stator data line and the data transmission medium 50 to the operating device 40. The components of the control system 100 which are arranged on the stator 200 can be, for example, the current sources 61, the coil monitoring elements 161 or the read-out electronics of the signal detection unit 114 of the position detection device 110. The stator 200 can also comprise one or a plurality of feed-in stator modules designed to produce a connection between the data transmission medium 50 and the stator data line. For this purpose, the feed-in stator modules can have external connections for connection to the data transmission medium 50. The feed-in stator modules can likewise be designed to be connected via external connections to a voltage supply device for generating the supply voltage of the current sources 61.

Figure 6:
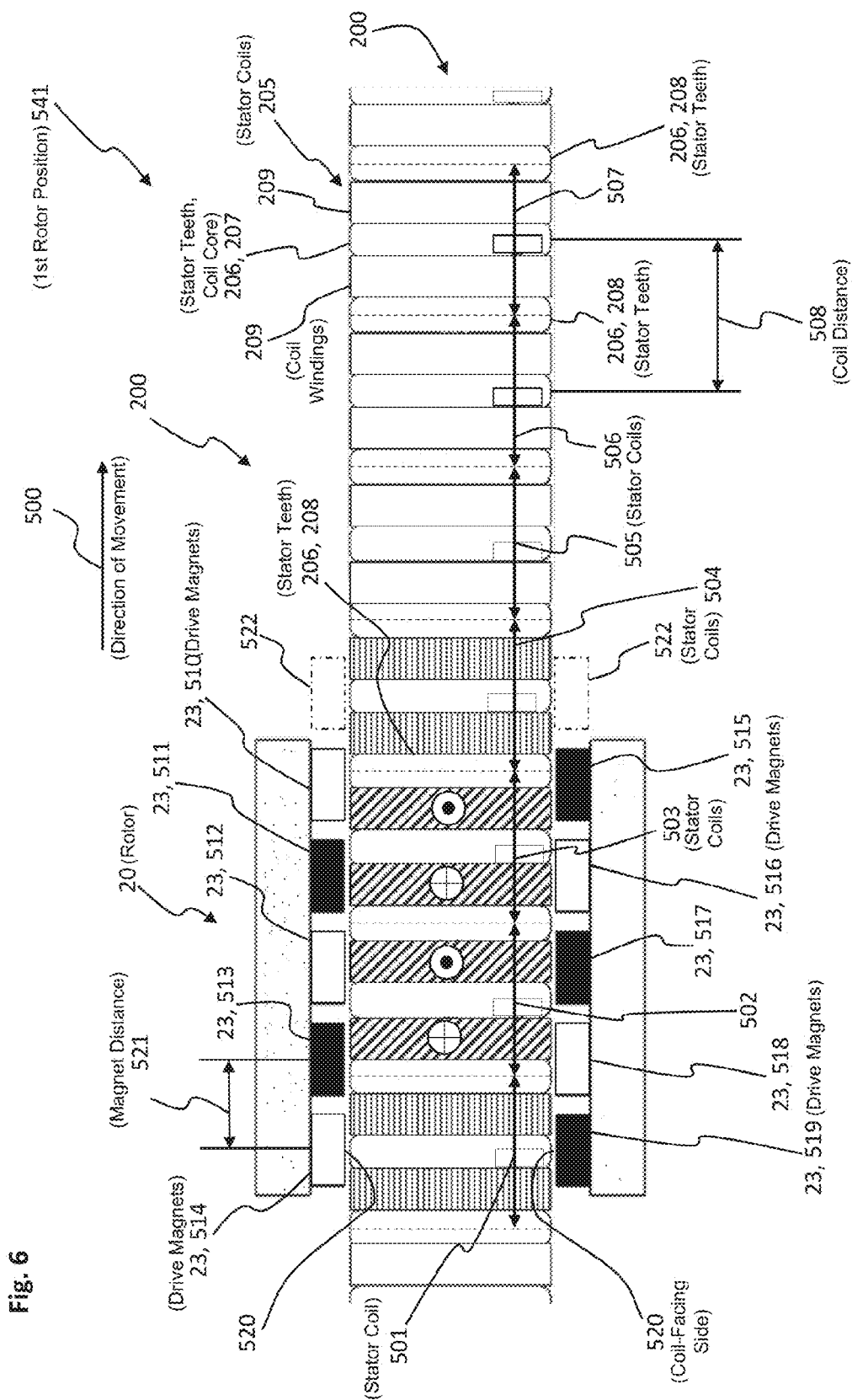
FIG. 6 shows a schematic sectional plan view of the electric motor with a rotor in a first rotor position.

In order to elucidate the functional principle of the electric motor 10 embodied as a linear motor and the determination of the energization position 156 from the coil data 152, FIG. 6 shows a plan view of the stator 200 and the rotor 20 in sectional view. The stator teeth 206 of the stator 200 are arranged parallel to one another and in a manner spaced apart from one another uniformly along the stator 200. Every second one of the stator teeth 206 forms a coil core 207 of one of the stator coils 205 and in each case has a coil winding 209 wound around it. FIG. 6 illustrates the coil windings 209 in cross section between the stator teeth 206. The stator teeth 206 which are arranged between the stator coils 205 and do not have the coil windings 209 wound around them form intermediate teeth 208 in each case.

The stator teeth 206 are fashioned partly or completely from a material having a high magnetic permeability, in order to amplify the magnetic flux density in the stator teeth 206. In the absence of the rotor 20, the magnetic flux density in one of the coil cores 207 is given by the current flow through the coil winding 209 used for winding around the relevant coil core. The magnetic flux density in one of the intermediate teeth 208 is determined from the current flows through the two coil windings 209 adjacent to the relevant intermediate tooth.

Overall, the stator coils 205 in each case comprise one of the stator teeth 206 used as coil cores 207, one of the coil windings 209 and in each case half of the intermediate teeth 208 adjacent to the coil winding 209 on both sides. The stator coils 205 are arranged in each case alongside one another and in a non-overlapping fashion along the stator 200. FIG. 6 illustrates a first stator coil 501, a second stator coil 502, a third stator coil 503, a fourth stator coil 504, a fifth stator coil 505, a sixth stator coil 506 and a seventh stator coil 507.

A magnetic field generated by the stator coils 205 interacts with the drive magnets 23 of the rotor 20 in order to exert a drive force on the rotor 20. The rotor 20 has overall ten of the drive magnets 23. Of the latter a first drive magnet 510, a second drive magnet 511, a third drive magnet 512, a fourth drive magnet 513 and a fifth drive magnet 514 are arranged on a side of one of the two limbs of the rotor 20 that faces the stator coils 205. On the opposite limb of the rotor 20, likewise in a manner arranged on a side facing the stator coils and opposite the drive magnets 510, 511, 512, 513, 514 there are arranged a sixth drive magnet 515, a seventh drive magnet 516, an eighth drive magnet 517, a ninth drive magnet 518 and a tenth drive magnet 519.

The first, second, third, fourth and fifth drive magnets 510, 511, 512, 513, 514, and the sixth, seventh, eighth, ninth and tenth drive magnets 515, 516, 517, 518, 519 are arranged in each case in a row and in a manner spaced apart from one another on the respective limbs of the rotor 20. On a side 520 of the first, second, third, fourth and fifth drive magnets 510, 511, 512, 513, 514 that faces the stator coils 205, the first, second, third, fourth and fifth drive magnets 510, 511, 512, 513, 514 in each case have an alternating magnetic polarity. In this case, the coil-facing sides 520 of the first drive magnet 510, of the third drive magnet 512 and of the fifth drive magnet 514 in each case have a magnetic south pole, while the coil-facing sides 520 of the second drive magnet 511 and of the fourth drive magnet 513 in each case have a magnetic north pole.

Drive magnets 23 opposite one another on the two limbs of the rotor 20 have in each case an opposite magnetic polarity on their coil-facing sides 520. The sixth drive magnet 515 is opposite the first drive magnet 510, the seventh drive magnet 516 is opposite the second drive magnet 511, the eighth drive magnet 517 is opposite the third drive magnet 512, the ninth drive magnet 518 is opposite the fourth drive magnet 513 and the tenth drive magnet 519 is opposite the fifth drive magnet 514. The coil-facing sides 520 of the sixth drive magnet 515, of the eighth drive magnet 517 and of the tenth drive magnet 519 in each case have a magnetic north pole, while the coil-facing sides 520 of the seventh drive magnet 516 and of the ninth drive magnet 518 in each case have a magnetic south pole.

A magnet distance 521, representing the distance between two adjacent drive magnets 23 and a coil distance 508 representing the distance between two adjacent stator coils 205 are chosen such that four times the coil distance 508 corresponds to five times the magnet distance 521. This is indicated in FIG. 6 with the aid of additional magnets 522 illustrated by dashed lines, the electric motor 10 not comprising said additional magnets.

The coil currents generated by the AC current signal in adjacent stator coils 205 have a phase offset of 300°. The energization region in which the stator coils 205 are energized, that is to say have the AC current signal applied to them, comprises in each case three or four of the stator coils 205 depending on the position of the rotor 20. Here in each case at least all those stator coils 205 whose coil cores 207 are situated along the stator 200 between the first drive magnet 510 and the fifth drive magnet 514 have the AC current signal applied to them or are energized therewith.

The energization of a stator coil situated ahead in the direction 500 of movement is begun while the first drive magnet 510 is moving above the intermediate tooth 208 arranged at that side of the stator coil situated ahead which faces the approaching rotor 20. In addition, an energization of a stator coil following counter to the direction of movement is only ended while the fifth drive magnet 514 is moving over the intermediate tooth 208 arranged at that said of the following stator coil which faces the rotor 20 moving away.

As the rotor 20 approaches, the stator coils 205, or the current sources 61 assigned to the stator coils 205, are already activated or enabled for an energization before the AC current signal is applied to the stator coils 205 and a current flow through the stator coils 205 is generated, that is to say that the stator coils 205 are energized. After an activation of one of the stator coils 205 and before the beginning of the energization of the relevant stator coil, the current source 61 assigned to the stator coil regulates the current flow through the relevant stator coil to zero. This has the consequence that any current flow through the relevant stator coil which can be generated by external magnetic fields varying over time, for example, is suppressed. Such external magnetic fields can be generated for example by the drive magnets 23 of the rotor 20 approaching the relevant stator coil.

Figure 7:
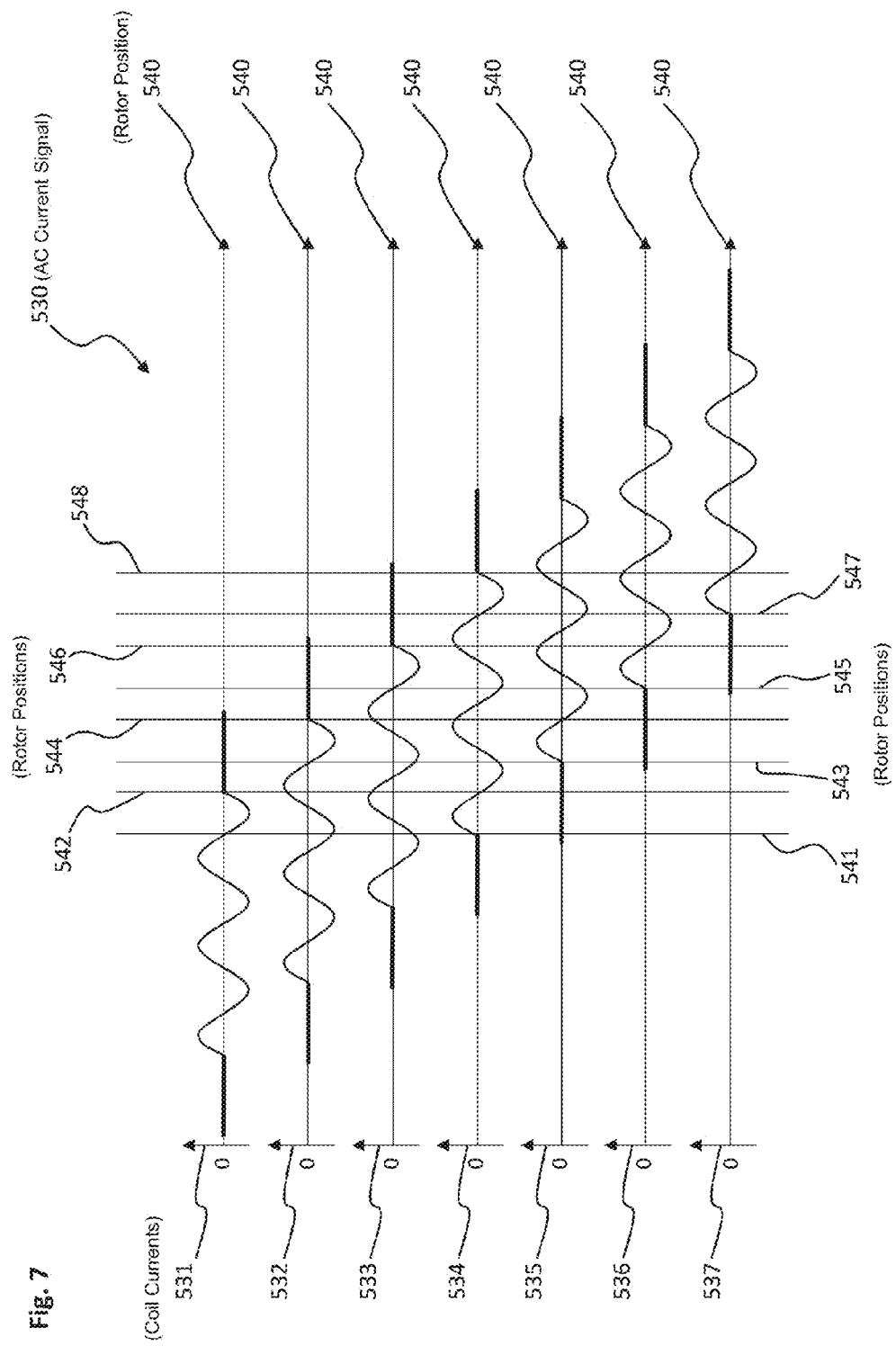
FIG. 7 shows an illustration of an AC current signal present at the electric motor.

FIG. 7 shows a graphical illustration of an AC current signal 530 which generates a propulsion of the rotor 20 in the direction 500 of movement, such that the rotor 20 moves at constant speed in the direction 500 of movement.

The illustration of the AC current signal 530 shows the dependence of the current flows or coil currents through the stator coils 205 illustrated in FIG. 6 from a rotor position 540 along the stator 200. The illustration shows a first coil current 531 through the first stator coil 501, a second coil current 532 through the second stator coil 502, a third coil current 533 through the third stator coil 503, a fourth coil current 534 through the fourth stator coil 504, a fifth coil current 535 through the fifth stator coil 505, a sixth coil current 536 through the sixth stator coil 506, and also a seventh coil current 537 through the seventh stator coil 507. If the coil currents through the stator coils 205 are generated by the current sources 61 by means of a pulse width modulation, then the coil currents 531, 532, 533, 534, 535, 536, 537 shown in FIG. 7 represent in each case the time-averaged current flow through the corresponding stator coils 205.

The abscissas of the illustrations in each case represent the rotor position 540 of the rotor 20 along the stator 200, and the coil current flowing in the corresponding rotor position 540 is plotted on the ordinate. If one of the coil currents 531, 532, 533, 534, 535, 536, 537 has negative values, then the relevant coil current flows in the direction which is identified by means of the punctiform and cross-shaped symbols at the second stator coil 502 and the third stator coil 503 in FIG. 6. In this case, the current direction in a part of the coil winding 209 that is identified by a point is directed perpendicularly to the plane of the drawing and out of the plane of the drawing, and the current direction in a region of the coil winding 209 that is identified by a cross is directed perpendicularly to the plane of the drawing and into the plane of the drawing. In the case of positive values of the coil currents 531, 532, 533, 534, 535, 536, 537 the current flows are oriented counter to the direction identified at the second and third stator coils 502, 503 in FIG. 6.

Given a constant speed of the rotor 20, the coil currents 531, 532, 533, 534, 535, 536, 537 of the AC current signal 530 effect harmonic oscillations having an identical frequency and a constant phase offset, depending on the rotor position 540. If the AC current signal 530 is generated by means of a pulse width modulation of the coil currents, then the coil currents 531, 532, 533, 534, 535, 536, 537 shown in FIG. 7 represent the current flow through the stator coils 205 that is established on average over time.

A first rotor position 541, identified by means of a vertical line on the abscissas, corresponds to the position of the rotor 20 on the stator 200 as illustrated in FIG. 6. In the first rotor position 541, the fifth drive magnet 514 and the tenth drive magnet 519 opposite the latter are situated in a centered fashion above the first stator coil 501. The first drive magnet 510 and the sixth drive magnet 515 opposite the latter cross precisely that one of the intermediate teeth 208 which is encompassed half each by the third stator coil 503 and the fourth stator coil 504, and begin to move over the coil winding of the fourth stator coil 504. In this case, that side surface of the corresponding intermediate tooth 208 which is adjacent to the fourth stator coil 504 is oriented parallel to those ends of the first drive magnet 510 and of the sixth drive magnet 515 which are situated ahead in the direction 500 of the movement. The remaining drive magnets 23 are situated in the region between the first stator coil 501 and the third stator coil 503.

Before the rotor 20 reaches the first rotor position 541, the first stator coil 501, the second stator coil 502 and the third stator coil 503 are energized and the first coil current 531, the second coil current 532 and the third coil current 533 have values different than zero. When the first rotor position 541 is reached, the first coil current 531 has a zero crossing and the fifth drive magnet 514 and the tenth drive magnet 519 are oriented in a centered fashion with respect to the last stator coil in the direction 500 of movement, namely the first stator coil 501. At this point in time, the energization of the next stator coil (not yet energized) in the direction 500 of movement, namely the energization of the fourth stator coil 504, is begun and an AC current signal is applied to the fourth stator coil 504. The second coil current 532 and the third coil current 533 in each case have a negative value when the first rotor position 541 is reached, as is indicated by the punctiform and cross-shaped symbols in FIG. 6.

Directly before the rotor 20 has reached the rotor position 541, therefore, only three of the stator coils 205, namely the first stator coil 501, the second stator coil 502 and the third stator coil 503, were energized. The fourth stator coil 504 and the current source 61 assigned thereto were already activated, and thus enabled for an energization, over a time period indicated by a horizontal line depicted in a thickened fashion on the abscissa of the illustration of the fourth coil current 534. In this time period, however, an AC current signal was not yet applied to the fourth stator coil 504, rather the current flow through the fourth stator coil 504 was regulated to zero by the associated current source. Likewise, the fifth stator coil 505 or the current source 61 thereof was already activated for an energization, without an AC current signal having been applied to the fifth stator coil 505.

When the rotor 20 passes across the first rotor position 541, the energization of the fourth stator coil 504 begins and the fourth coil current 534 has for the first time a value different than zero. A phase in which a total of four of the stator coils 205, namely the first, second, third and fourth stator coils 501, 502, 503, 504, are energized subsequently begins. The fifth stator coil 505 remains activated, but an AC current signal is not applied to it even after the first rotor position 541 has been crossed.

Figure 8:
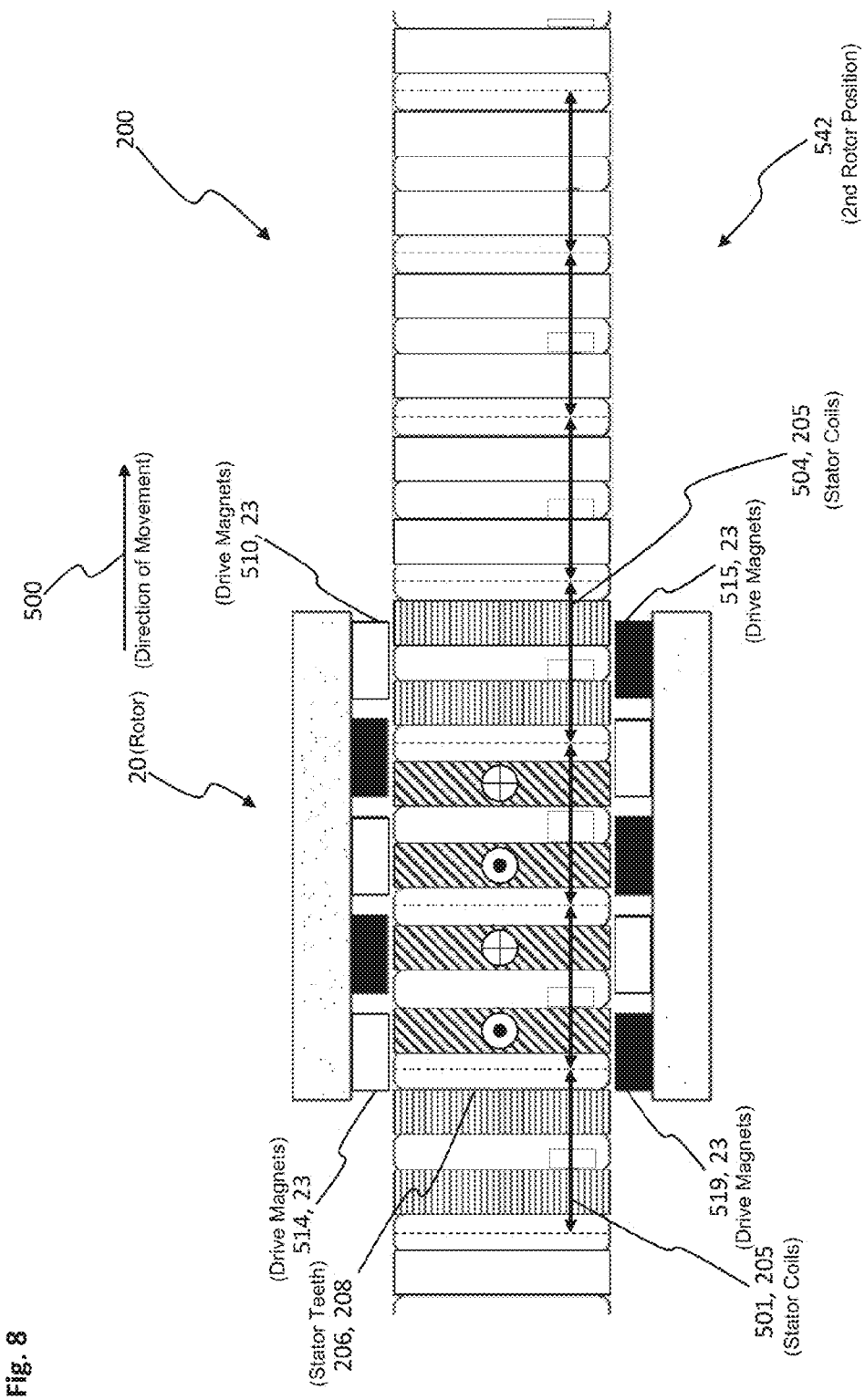
FIGS. 8-14 show schematic sectional plan views of the electric motor with the rotor respectively in a second to eighth rotor position.\

After a first positive half-oscillation of the third coil current 534, or after a negative half-oscillation of the first coil current 531, the rotor 20 has moved further by the magnet distance 521 in the direction 500 of movement and reached a second rotor position 542, which is illustrated in FIG. 8. In the second rotor position 542, the first drive magnet 510 and the sixth drive magnet 516 are oriented in a centered fashion relative to the fourth stator coil 504. The fifth drive magnet 514 and the tenth drive magnet 519 move precisely over one of the intermediate teeth 208, namely over the intermediate tooth 208 which is encompassed half each by the first stator coil 501 and the second stator coil 502. In this case, a rear end (in the direction 500 of movement) of the fifth and of the tenth drive magnet 514, 519 is centered above that end of the relevant intermediate tooth 208 which is adjacent to the first stator coil 501. The remaining drive magnets 23 are situated in the region between the second stator coil 502 and the fourth stator coil 504.

Between the point in time at which the rotor 20 is situated in the first rotor position 541 during its movement in the direction 500 of movement and the point in time at which the rotor 20 is situated in the second rotor position 542, four of the stator coils 205, namely the first, second, third and fourth stator coils 501, 502, 503, 504, are energized continuously. Here the coil currents in the second stator coil 502 and the third stator coil 503 in each case have a zero crossing during the energization. The fifth stator coil 505, whose current source 61 was already activated and thus enabled for an energization before the rotor 20 had reached the first rotor position 541, still remains activated. However, the current flow through the fifth stator coil 505 is still regulated to zero during this time.

When the second rotor position 542 is reached, the first coil current 531 through the first stator coil 501 and the fourth coil current 534 through the fourth stator coil 504 have a zero crossing. The second coil current 532 and the third coil current 533 in each case have a positive value, as is also indicated by the punctiform and cross-shaped symbols in FIG. 8.

When the second rotor position 542 is reached, the energization of the last energized stator coil in the direction 500 of movement, namely the energization of the first stator coil 501, is ended. After the rotor 20 has passed the second rotor position 542, therefore, only three of the stator coils 205, namely the second, third and fourth stator coils 502, 503, 504, are energized. Since the energization of the first stator coil 501 was ended when the second rotor position 542 was reached, during a further movement of the rotor 20 the first stator coil 501 initially still remains activated and the first coil current 531 through the first stator coil 501 is regulated to zero.

Figure 9:
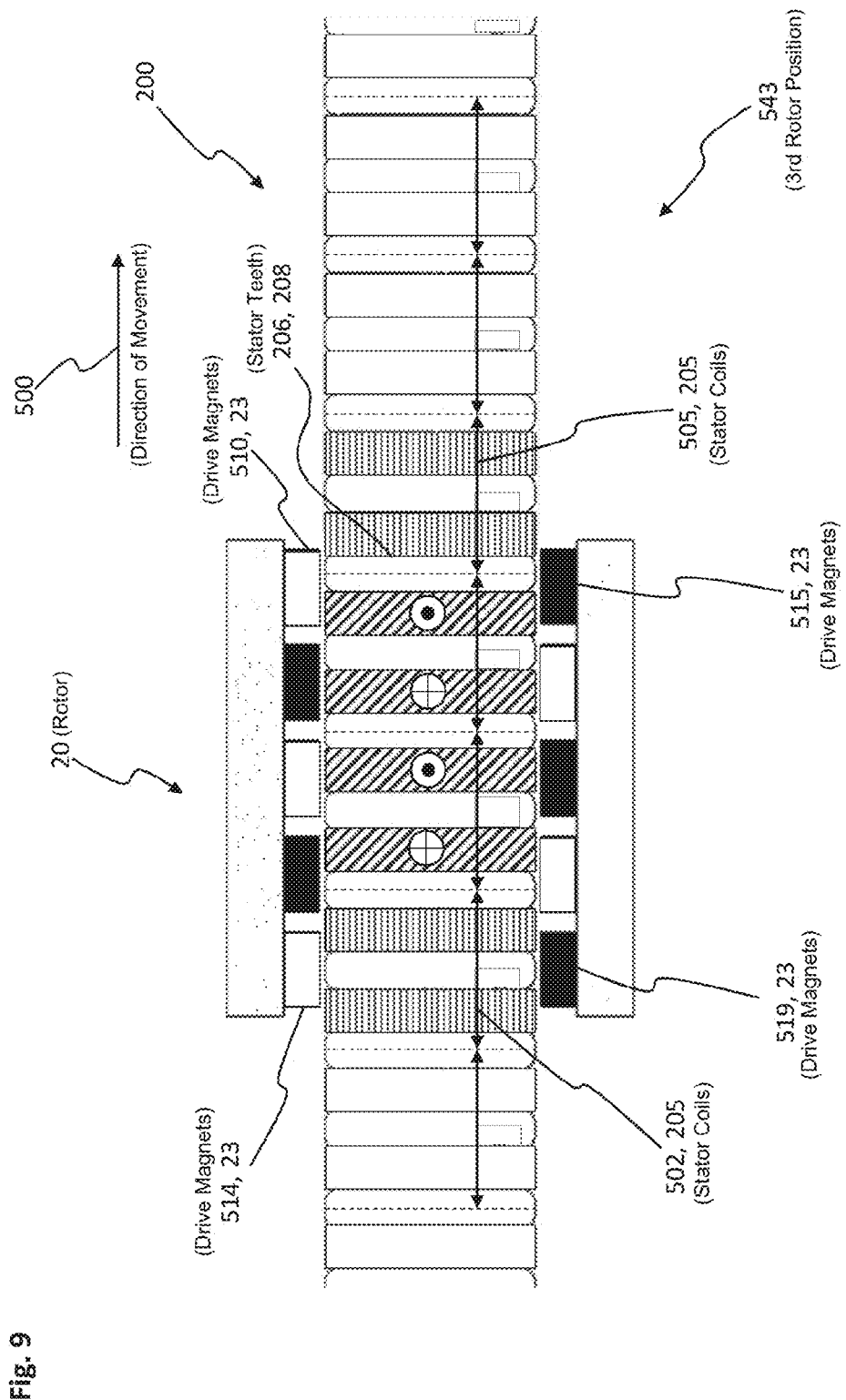

FIG. 9 illustrates a third rotor position 543, which the rotor 20 reaches following the second rotor position 542 at the point in time at which the second coil current 532 through the second stator coil 502 effects its next zero crossing. In comparison with the first rotor position 541, the rotor 20 upon reaching the third rotor position 543 has moved further by a distance along the stator 200 which corresponds to the coil distance 508.

The relative position of the drive magnets 23 and of the stator coils 205 in the third rotor position 543 therefore substantially corresponds to the relative position in the first rotor position 541, wherein the fifth and tenth drive magnets 514, 519 are not oriented in a centered fashion with the first stator coil 501, but rather in a centered fashion with the second stator coil 502. Accordingly, the first and sixth drive magnets 510, 515 move precisely above that one of the intermediate teeth 208 which is arranged at the rear side (in the direction 500 of movement) of the fifth stator coil 505, that is to say is encompassed half each by the fourth stator coil 504 and the fifth stator coil 505. In the third rotor position 543, the side surface—facing the fifth stator coil 505—of the intermediate tooth 208 between the fourth and fifth stator coils 504, 505 is oriented substantially parallel to that end of the first drive magnet 510 and of the sixth drive magnet 515 which is situated ahead in the direction of movement.

While the rotor 20 moves from the second rotor position 542 into the third rotor position 543, the fifth stator coil 505, which has already been activated and has already been enabled for an energization, is still regulated to zero, such that the flow of the fifth coil current 535 through the fifth stator coil 505 is regulated to zero. The first stator coil 501 also remains activated and enabled for an energization during this time, wherein the first coil current 531 through the first stator coil 501 is adjusted to zero, like the fifth coil current 535. In addition, while the rotor 20 moves from the second rotor position 542 into the third rotor position 543, the sixth stator coil 506 is activated and enabled for an energization, but the sixth coil current 536 through the sixth stator coil 506 is likewise actively regulated to zero.

When the third rotor position 543 is reached, the second coil current 532 has precisely a zero crossing, whereas the third coil current 533 and the fourth coil current 534 in each case have a negative value. As at the first rotor position 541, when the third rotor position 543 is reached, the energization of the next, unenergized stator coil in the direction of movement is begun. This is the fifth stator coil 505 in the third rotor position 543. Consequently, after the third rotor position 543 has been reached, the fifth coil current 535 through the fifth stator coil 505 has a value different than zero. After the third rotor position 543 has been crossed, therefore, once again four of the stator coils 205, namely the second, third, fourth and fifth stator coils 502, 503, 504, 505, are energized.

Figure 10:
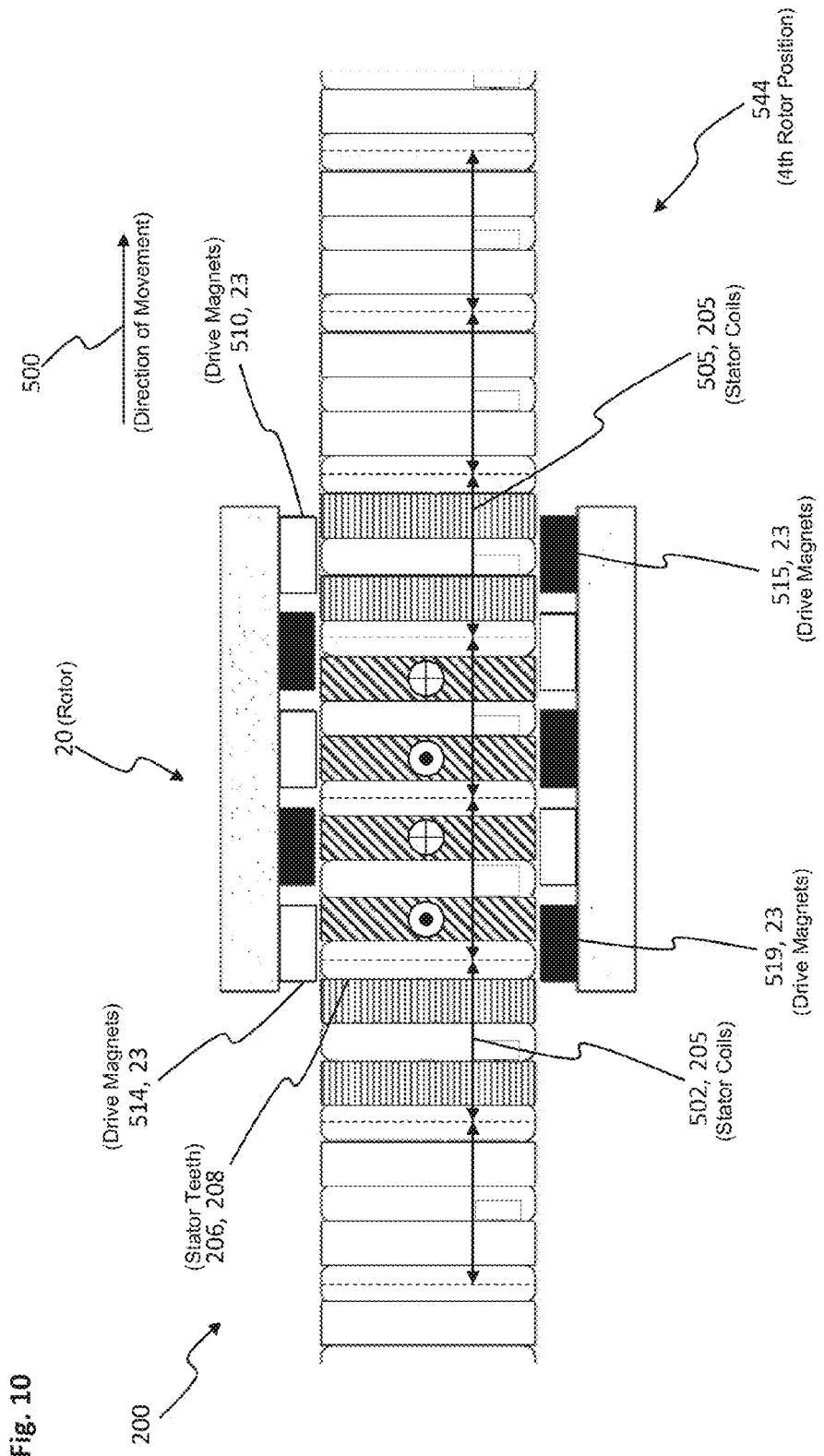

Since the energization of the fifth stator coil 505 was begun in the third rotor position 543, the rotor 20 moves further until it has reached a fourth rotor position 544 after half a period of the second coil current 532 or after half a period of the fifth coil current 535. In comparison with the second rotor position 542, the rotor 20 has moved further by the coil distance 508 upon reaching the third rotor position 543. The relative position between the drive magnets 23 and the stator coils 205 in the fourth rotor position 544 is illustrated in FIG. 10 and substantially corresponds to the position in the second rotor position 542, wherein the first drive magnet 510 and the sixth drive magnet 515 are not centered above the fourth stator coil 504, but rather above the fifth stator coil 505.

While the rotor 20 moves from the third rotor position 543 into the fourth rotor position 544, the first stator coil 501 and the sixth stator coil 506 remain activated, but a coil current different than zero is not applied to them. When the fourth rotor position 544 is reached, the second coil current 532 through the second stator coil 502 and the fifth coil current 535 through the fifth stator coil 505 are at a zero crossing. The third coil current 533 and the fourth coil current 534 have positive current values.

As described in connection with the second rotor position 542, the energization of the last energized stator coil in the direction 500 of the movement is ended in the fourth rotor position 544. This is the second stator coil 542 in the fourth rotor position 544, such that when the fourth rotor position 544 is reached, the energization of the second stator coil 502 is ended and the second coil current 532 through the second stator coil 502 is actively regulated to zero after the fourth rotor position 544 has been crossed. Therefore, after the fourth rotor position 544 has been passed through, no longer four but rather only three of the stator coils 205 have an AC current signal applied to them or are energized therewith, namely the third stator coil 503, the fourth stator coil 504 and the fifth stator coil 505. Although the second stator coil 502 and the sixth stator coil 506 remain activated and thus enabled for an energization after the fourth rotor position 544 was passed through, a current flow through the second and sixth stator coils 502, 506 is regulated to zero.

Figure 11:
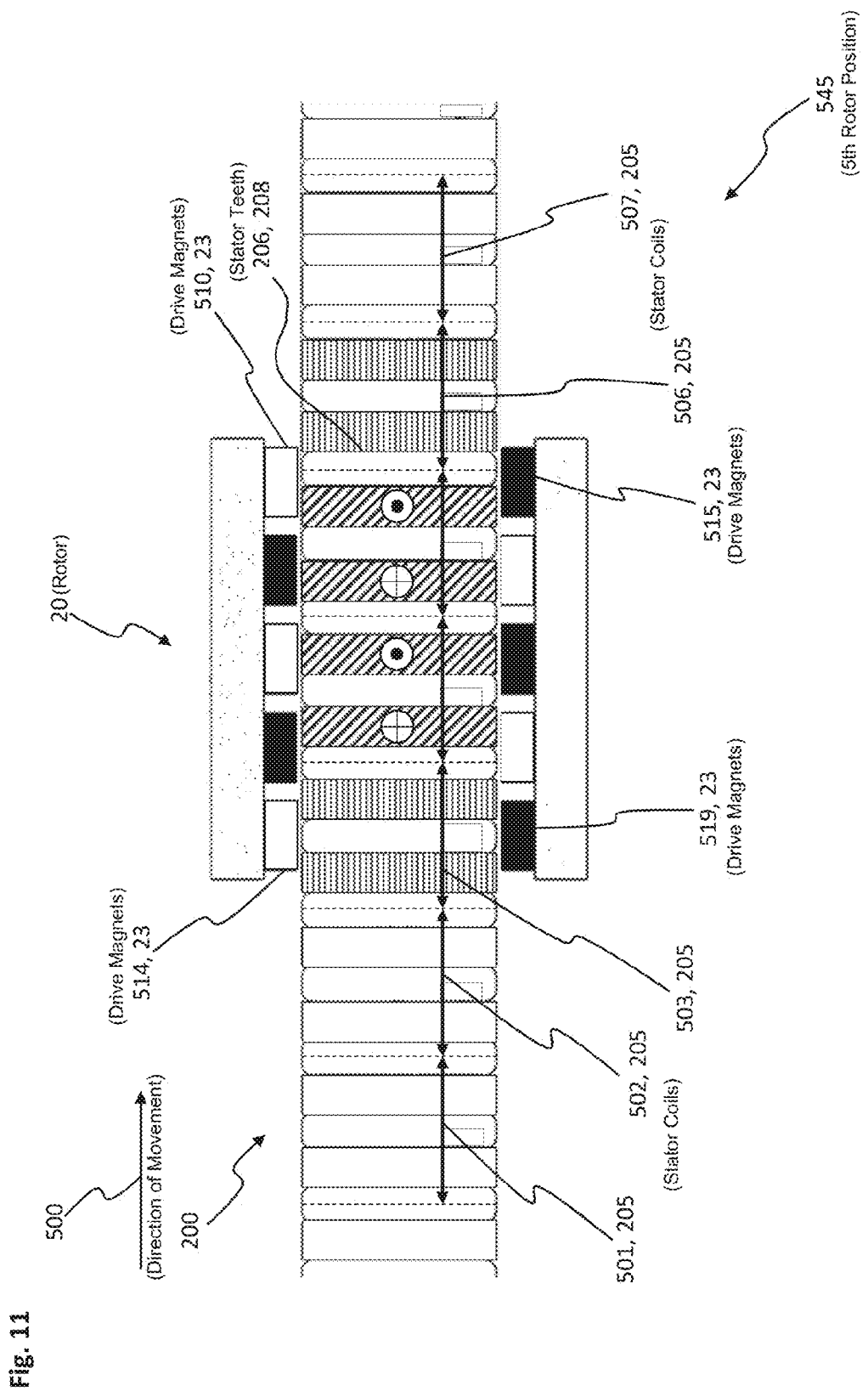

Once the rotor 20 has moved further from the fourth rotor position 544 by the magnet distance 521 in the direction 500 of movement, it reaches a fifth rotor position 545, which is illustrated in FIG. 11. Relative to the third rotor position 543, the rotor 20 upon reaching the fifth rotor position 545 has moved further by the coil distance 508, and by double the coil distance 508 relative to the first rotor position 541. The relative position of the drive magnets 23 of the rotor 20 in relation to the stator coils 205 in the fifth rotor position 545 therefore corresponds to the greatest possible extent to the relative position in the first rotor position 541 and the third rotor position 543, wherein the fifth drive magnet 514 and the tenth drive magnet 519 in the fifth rotor position 545 are oriented in a centered fashion with the third stator coil 503. The third coil current 533 through the third stator coil 503 is at a zero crossing when the fifth rotor position 545 is reached.

While the rotor 20 moves from the fourth rotor position 544 into the fifth rotor position 545, the enabling or activation of the first stator coil 501 is ended and the first coil current 531 through the first stator coil 501 is no longer actively regulated to zero. At this point in time, the distance between the rotor 20 and the first stator coil 501 is more than the coil distance 508 and a magnetic field which could be generated by a current flow through the first stator coil 501 exerts only a negligible force on the drive magnets 23 of the rotor 20. Moreover, during the movement of the rotor 20 from the fourth rotor position 544 into the fifth rotor position 545, the seventh stator coil 507 is activated and thus enabled for an energization, but a current flow through the seventh stator coil 507 is initially still regulated to zero.

As described in connection with the first rotor position 541 and the third rotor position 543, the energization of the next unenergized stator coil in the direction 500 of movement is begun in the fifth rotor position 545. In the fifth rotor position 545, said stator coil is the sixth stator coil 506 and the sixth coil current 536 through the sixth stator coil 506 has a value different than zero for the first time after the fifth rotor position 545 has been reached.

The rotor 20 moves from the fifth rotor position 545 into a sixth rotor position 546, wherein the rotor 20 reaches the sixth rotor position 546 after half a period of the third coil current 533 or after half a period of the sixth coil current 536. In this case, the rotor 20 moves further by the magnet distance 521 along the stator 200. Relative to the fourth rotor position 544, the rotor upon reaching the sixth rotor position 546 has moved further by the coil distance 508, and by double the coil distance 508 relative to the second rotor position 542.

Figure 12:
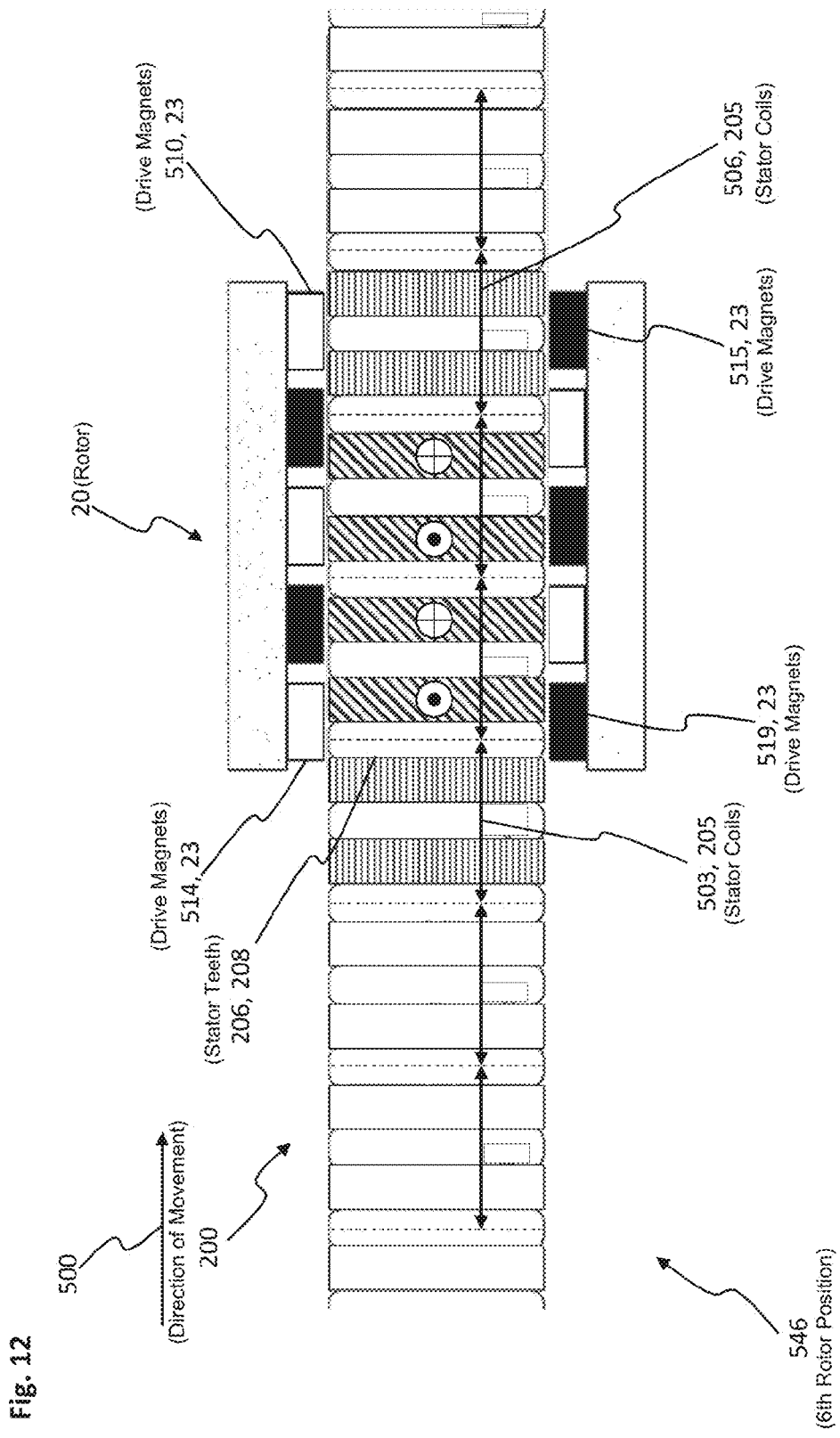

The relative position between the drive magnets 23 of the rotor 20 and the stator coils 205 in the sixth rotor position 546 is illustrated in FIG. 12. As at the second and fourth rotor positions 542, 544 the first drive magnet 510 and the sixth drive magnet 515 in the sixth rotor position 546 are oriented in a centered fashion with one of the stator coils 205, in this case with the sixth stator coil 506.

As at the second and fourth rotor positions 542, 544, the energization of the last energized stator coil in the direction 500 of movement, in this case the energization of the third stator coil 503, is ended when the sixth rotor position 546 is reached. However, the third stator coil 503 initially remains activated for an energization and the current flow through the third stator coil 503, or the third coil current 533 is actively regulated to zero.

From the sixth rotor position 546, the rotor 20 moves further along the stator 200 in the direction 500 of movement until it reaches a seventh rotor position 547 upon the next zero crossing of the fourth coil current 534. While the rotor 20 moves from the sixth rotor position 546 into the seventh rotor position 547, the activation of the second stator coil 502 is ended and the current flow through the second stator coil 502 or the second coil current 532 from then on is no longer regulated to zero. In addition, an eighth stator coil adjacent to the seventh stator coil 507 is activated for an energization and a current flow through said stator coil is initially still adjusted to zero.

Figure 13:
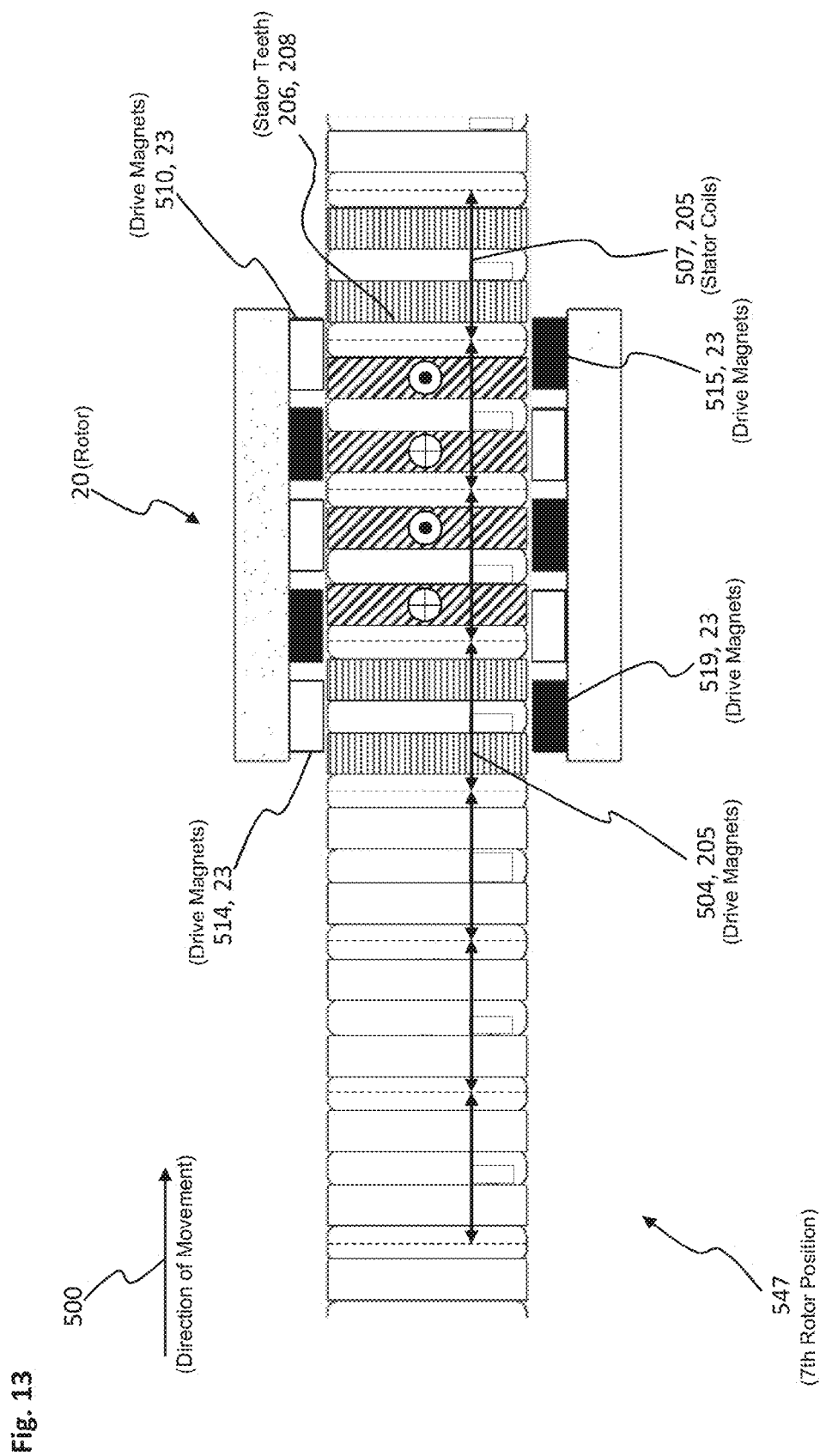

The relative position between the drive magnets 23 of the rotor 20 and the stator coils 200 in the seventh rotor position 547 is illustrated in FIG. 13. Compared with the fifth rotor position 545, the rotor 20 upon reaching the seventh rotor position 547 has moved further by the coil distance 508. As in the first, third and fifth rotor positions 541, 543, 545, in the seventh rotor position 547 the fifth drive magnet 514 and the tenth drive magnet 519 are oriented in a substantially centered fashion with one of the stator coils 205, namely the fourth stator coil 504. In the same way as when the first, third and fifth rotor positions 541, 543, 545 are reached, the energization of the next, unenergized stator coil in the direction 500 of movement, namely the energization of the seventh stator coil 507, is begun when the seventh rotor position 547 is reached.

Following the seventh rotor position 547, the rotor 20 moves into an eighth rotor position 548 during half a period of the fourth coil current 534 or during half a period of the sixth coil current 536. In this case, the rotor 20 covers a distance corresponding to the magnet distance 521.

Figure 14:
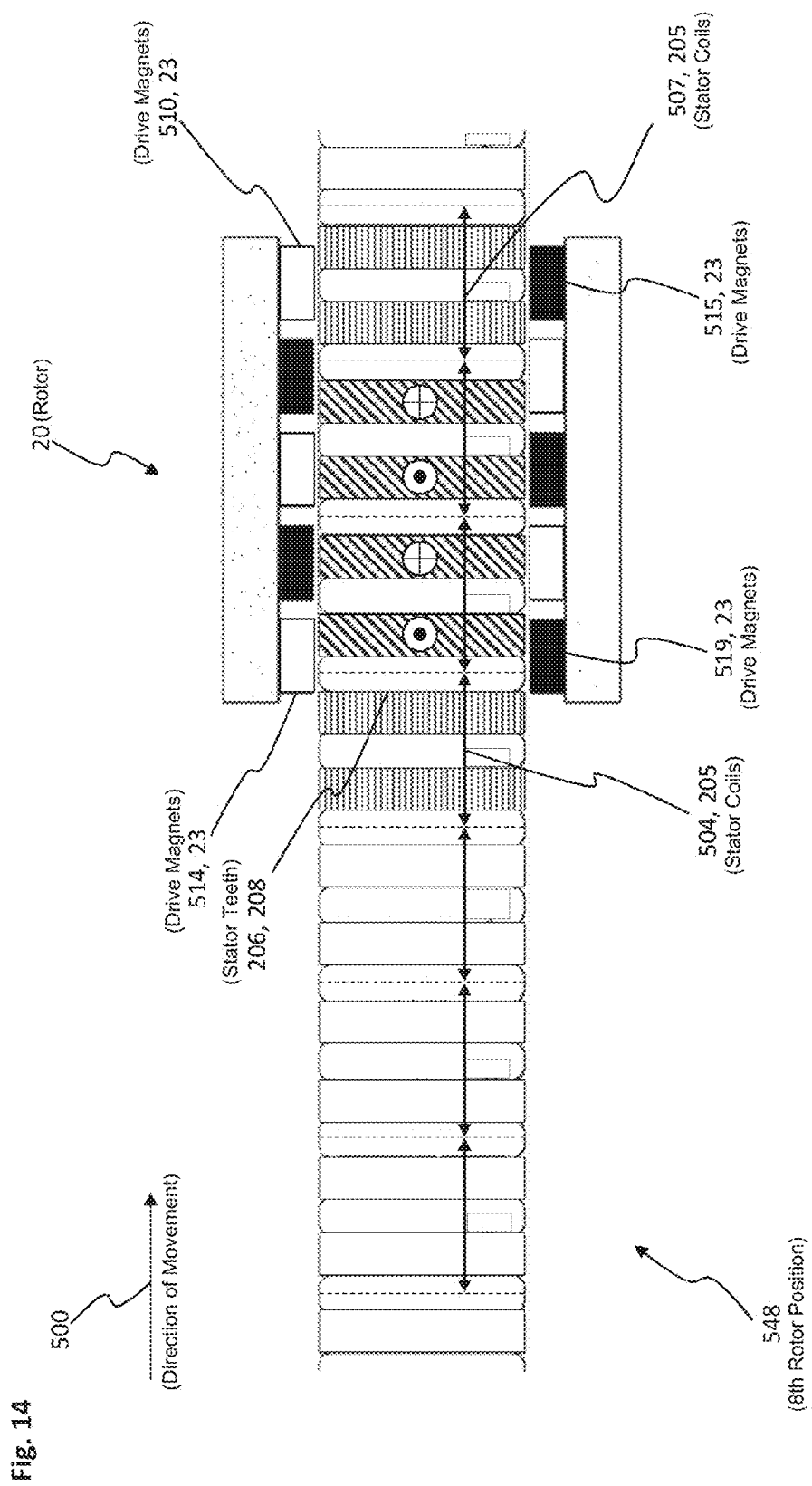

The relative position of the drive magnets 23 and of the stator coils 205 in the eighth rotor position 548 is illustrated in FIG. 14. Relative to the sixth rotor position 546, the rotor 20 upon reaching the eighth rotor position 548 has moved further by the coil distance 508. The relative position of the drive magnets 23 and of the stator coils 205 in the eighth rotor position 548 corresponds to the relative position in the second, fourth and sixth rotor positions 542, 544, 546, in so far as the first drive magnet 510 and the sixth drive magnet 515 are oriented in a centered fashion with the frontmost energized stator coil in the direction 500 of movement, namely in a centered fashion with the seventh stator coil 507.

At the point in time at which the rotor 20 reaches the eighth rotor position 548, the fourth coil current 534 and the seventh coil current 537 are at a zero crossing. Analogously to the second, fourth and sixth rotor positions 542, 544, 546, when the eighth rotor position 548 is reached the energization of the last energized stator coil in the direction 500 of movement, namely the energization of the fourth stator coil 504, is ended and the current flow through the fourth stator coil 504 is regulated to zero as soon as the rotor 20 has passed across the eighth rotor position 548.

The safety device 130 and the position calculation module 132 can determine the position of the rotor 20 from the position and number of those of the stator coils 205 which are enabled or activated for an energization. By way of example, the second stator coil 502, the third stator coil 503, the fourth stator coil 504, the fifth stator coil 505 and the sixth stator coil 506 can be activated for an energization. It can be deduced from this that the rotor 20, in the direction 500 of movement, is situated after a first position, upon the reaching of which the enabling of the first stator coil 501 was ended, and before a second position, upon the reaching of which the enabling of the seventh stator coil 507 will be effected.

At another point in time, it is also possible for exclusively the second stator coil 502, the third stator coil 503, the fourth stator coil 504, the fifth stator coil 505, the sixth stator coil 506 and the seventh stator coil 507 to be activated. It can be deduced from this that the rotor 20, in the direction 500 of movement, is situated after a position upon the reaching of which the seventh stator coil 507 was enabled for energization, and before a position upon the reaching of which the enabling of the second stator coil 502 will be ended.

The determination of the position of the rotor from the number and position of the stator coils 205 activated for an energization is beset by an inaccuracy. This inaccuracy, in the case of the AC current signal 530 illustrated in FIG. 7, results from the distance covered by the rotor 20 after the enabling of a stator coil 205 before the next time the enabling of an activated stator coil 205 is ended, or from the distance covered by the rotor 20 after the ending of the enabling of a stator coil 205 before the next stator coil 205 is enabled. As illustrated in FIG. 7, in the case of the AC current signal 530, the time interval between the ending of the enabling of a stator coil 205 and the enabling of the next stator coil 205 is shorter than the time interval between the enabling of a stator coil 205 and the subsequent ending of the enabling of an activated stator coil 205. In the case of AC current signals for which the enabling or the ending of the enabling is effected at earlier or later points in time, these time intervals can also have other lengths.

A more accurate determination of the position of the rotor 20 along the stator 200 is possible if the safety device evaluates the phase of one or a plurality of the coil currents in addition to the number and position of the stator coils 205 activated or enabled for an energization. By way of example, the position of the rotor 20 between the first rotor position 541 and the third rotor position 543 can be determined unambiguously and exactly on the basis of the phase of the fourth coil current 534. Which coil current is used for the phase evaluation depending on the position of the energization region can be stored, for example, in the safety device 130 or the position calculation module 132. By way of example, in each case the coil current in the frontmost stator coil 205 in the direction 500 of movement can be involved here. Therefore, the phase of the fourth coil current 534 would be evaluated between the first rotor position 541 and the third rotor position 543, the phase of the fifth coil current 535 would be evaluated between the third rotor position 543 and the fifth rotor position 545, and the phase of the sixth coil current 536 would be evaluated between the fifth rotor position 545 and the seventh rotor position 547. An unambiguous and exact determination of the position of the rotor 20 is always possible as a result.

Instead of the position and number of the stator coils 205 enabled for an energization, for a coarse determination of the position of the rotor 20 it is also possible to use the position and number of those stator coils 205 which are energized by the AC current signal, that is to say have a coil current different than zero. By way of example, from the fact that the first, second, third and fourth stator coils 501, 502, 503, 504 are energized, it can be deduced that the rotor 20 is situated between the first rotor position 541 and the second rotor position 542. Correspondingly, from an energization of the second, third and fourth stator coils 502, 503, 504, it can be deduced that the rotor 20 is situated between the second rotor position 542 and the third rotor position 543.

An energization of the stator coils 205 can be discovered in each case by virtue of the fact that the relevant coil current has current values different than zero, in principle, unless the relevant coil current is precisely at a zero crossing characteristic of the AC current signal 540. By way of example, the first coil current 531 has such a zero crossing when the rotor 20 reaches the first rotor position 541, or the fourth coil current 534 has such a zero crossing when the rotor 20 reaches the second rotor position 542. A situation in which such a zero crossing is present can be differentiated from a situation in which the relevant stator coil 205 is not energized for example by virtue of the fact that stator coils 205 adjacent to the relevant stator coil 205 have a current flow different than zero.

In the case of the illustrations of the rotor positions 541 to 548 in FIGS. 6 and 8 to 14 it is assumed that the rotor 20 is moved without contouring errors and with a constant force along the stator 200. During a movement of the rotor 20 without contouring errors, two opposite drive magnets from among the drive magnets 23 are always situated in a centered fashion above one of the stator coils 205 if the coil current in the relevant stator coil precisely effects a zero crossing. The occurrence of a contouring error can be prevented, for example, by the phase angle of the AC current signal applied to the stator coils 205 being suitably readjusted by the control system 100 continuously on the basis of the present position of the rotor 20.

The position of the rotor 20 can be determined from the coil currents or the activation of the stator coils 205 analogously to the manner presented here also if the rotor 20 is moved along the stator 200 by means of a different AC current signal 530 than the one illustrated in FIG. 7. Depending on the geometry and number of the drive magnets 23 and of the stator coils 205, a suitable AC current signal can have for example more or fewer than the phases illustrated in FIG. 7.

Likewise, an activation of the stator coils 205 for energization during the approach of the rotor 20 can be carried out in each case at an earlier or a later point in time than is illustrated in FIG. 7. Moreover, the activation of the stator coils 205 can be ended at an earlier or a later point in time. Analogously to the manner presented here, the position of the rotor 20 can be determined from the activation state of the stator coils even if in each case more or fewer than the stator coils 205 illustrated in FIG. 7 are activated. It is also possible for the stator coils 205 to be activated only when the AC current signal is applied to them, that is to say that a current flow is intended to be generated. This would be the case for the fourth stator coil 504, the fifth stator coil 505, the sixth stator coil 506 or the seventh stator coil 507 respectively when the rotor 20 reaches the first rotor position 541, the third rotor position 543, the fifth rotor position 545 and the seventh rotor position 547. Analogously, the enabling of the stator coils 205 can also already be ended as soon as a current flow is no longer generated in the stator coils 205. In these cases, too, it is possible to determine the position of the rotor 20 from the energization region and/or the coil currents, analogously to the manner as described in association with the AC current signal 530 in FIG. 7.

It is likewise possible to determine the position of the rotor 20 from the coil currents or the activation of the stator coils 205 analogously to the method described in association with FIGS. 6 to 14 if an energization of the stator coils 205 is begun or ended with the rotor 20 at a smaller or larger distance from the relevant stator coil than is the case for the AC current signal 530 illustrated in FIG. 7. By way of example, the stator coils 205 can be energized in such a way that the coil current in a newly energized stator coil after the beginning of the energization, in comparison with the AC current signal 530 illustrated in FIG. 7, additionally effects one or a plurality of half-oscillations before the rotor 20 reaches the relevant stator coil.

The AC current signal need not necessarily be harmonic in order that the position of the rotor 20 can be determined from the coil currents or from the activation state of the stator coils 205. The position determination described in association with FIGS. 6 to 14 can be employed analogously for example also in the case of an AC current signal whose coil currents have a rectangular or triangular waveform.

The AC current signal can also have a harmonic fundamental oscillation that is embodied and propagated like the AC current signal 530 illustrated in FIG. 7. In addition to the fundamental oscillation, harmonics of the fundamental oscillation can be superposed on said AC current signal. A suitable adaptation of the superposition can make it possible, for example, to move a plurality of rotors 20 closely alongside one another, for example touching one another, along the stator 200, to improve the travel of the rotor 20 in curved sections of the stator 200 and to compensate for geometry effects in said sections, to reduce force spikes of the force exerted on the rotor 20 by the magnetic field of the stator coils 205, to compensate for cogging torques in the interaction of the drive magnets 23 of the rotor 20 with the stator teeth 206, or to reduce the thermal loading of the stator 200 by the coil currents through the stator coils 205.

The determination of the position of the rotor 20 is described in FIGS. 6 to 14 on the basis of stator coils 205 which are arranged in a manner spaced apart from one another and in a non-overlapping manner along the stator 200. However, an analogous determination of the position of the rotor 20 is also possible if the stator coils 205 are arranged in an overlapping manner and a correspondingly adapted AC current signal is applied to them.

In order to bring about a movement of the rotor 20 along the stator 200 in conjunction with low electrical losses, the AC current signal 530 formed from the coil currents has substantially exclusively torque-forming current components. In this case, a force exerted on the rotor 20 is proportional to the amplitude of the torque-forming component of the AC current signal 530. If only a small force is exerted on the rotor 20, as may be the case for example for a slow travel of the rotor 20 in conjunction with low friction, the amplitudes of the coil currents may be so small that the coil currents are no longer detected unambiguously by the coil monitoring device 120 or the safety device 130. By way of example, electronic noise from electronic components of the coil monitoring device 120 or the current sources 61 can be superposed on a measurement signal of the coil currents. When the rotor 20 is at a standstill, the amplitude of the torque-forming current component of the AC current signal 530 approximately vanishes and coil currents can no longer be measured by the coil monitoring device 120.

If the control system 100 is designed to the effect that although the coil data 152 contain the magnitude of the coil currents, they do not contain information about whether or not the stator coils 205 are enabled for an energization, the position of the rotor 20 can no longer be determined unambiguously from the AC current signal 530 if the amplitude of the coil currents falls below a lower limit value. This is the case for an AC current signal 530 having substantially torque-forming current components for example when the rotor 20 is at a standstill or during a movement of the rotor 20 with small force action. In order nevertheless to enable a determination of the position of the rotor 20 from the coil currents in these cases, the control system 100 can apply a proximity current signal to the stator coils 205 in addition to the substantially torque-forming AC current signal 530.

The proximity current signal is designed in such a way that it exerts no drive force in the direction of movement on the rotor 20, but generates a current flow through the stator coils 205 in the vicinity of the rotor 20, which can be detected unambiguously by the coil monitoring device 120 or the safety device 130. In order to prevent the proximity current signal from exerting a drive force on the rotor 20, the proximity current signal can have, for example, substantially flux-forming current components, but not torque-forming current components. The flux-forming current components of the proximity current signal generate coil currents in the stator coils 205 such that a force on the rotor 20 that is caused by a magnetic field of the coil currents is directed perpendicularly to the direction 500 of movement of the rotor 20.

The proximity current signal can also have alternating current components, wherein the direction of the magnetic field generated by the current components changes so rapidly that the rotor 20 cannot follow this magnetic field on account of its mass inertia. In such a case, the current components of the proximity current signal cancel one another out in terms of their effect on the rotor 20 on average over time.

The proximity current signal is applied to all those stator coils 205 which are situated in the vicinity of the rotor 20. These may be, for example, all those stator coils 205 which are activated for an energization with the AC current signal 530. However, the proximity current signal can also be applied only to all those stator coils 205 which are energized by the AC current signal 530 and to which a coil current different than zero is applied during a movement of the rotor 20.

The proximity current signal is applied in addition to the AC current signal 530 that drives the rotor 20 in the direction of movement. In particular, the proximity current signal is still applied if the rotor 20 is at a standstill. In this case, an additional current flow generated by the proximity current signal in the stator coils 205 is always large enough that it can be unambiguously detected by the control system 100, for example by the coil monitoring device 120, and the position of the rotor 20 along the stator 200 can be determined from the detected current flow.

If the coil data 152 comprise both the activation state of the stator coils 205 and the coil current through the individual stator coils 205 or the voltages dropped across the stator coils, the safety device 130 can also be designed, in the context of the coordination between the coil data 152 and the position data 150, to check the coil data 152 to the effect of whether the coil current of one of the stator coils 205 is compatible with the activation state thereof. In particular, the safety device 130 can identify an erroneous function of the control system 100 which consists in the fact that although current flows through a stator coil, said stator coil is not activated or enabled. The safety device 130 can furthermore be designed to cause the electric motor 10 to be transferred to a safe state in the event of such an error occurring.

A drive having a control system can also comprise a plurality of rotors designed like the rotor 20. In so far as no differences are described below, such a drive having a plurality of rotors can be embodied like the drives 1, 300. The drive having a plurality of rotors can be designed to move the plurality of rotors individually and independently of one another along the stator 200. In such a case, the position data 150 can represent the positions of all rotors movable along the stator 200. In the case of a position detection device 110 embodied as an inductive position detection device, the position data 150 can contain for example all differential voltages induced by the individual transmitter units of the rotors. In such a case, the position determining module 140 is designed to determine in each case the positions of the individual rotors from the position data 150 and to produce a plurality of rotor positions assigned in each case to one of the rotors.

A control system for a plurality of rotors which is designed to control the movement of a plurality of rotors along the stator 200 comprises a respective positional control module 144, a respective current data generating module 146 and a respective individual current division module 148 for each of the rotors. The positional control modules here receive from the position determining module 140 in each case that rotor position which represents the position of the assigned rotor. The individual current data generating modules communicate current data which are assigned respectively to a rotor to the respectively associated individual current division module. The individual current division modules are designed to divide the current data assigned respectively to the rotors into energization data assigned respectively to one of the stator coils 205.

A safety device of the control system for a plurality of rotors comprises a position calculation module, which calculates a respective energization position from the coil data 152 for each of the rotors. In so far as no differences are described, the safety device of the control system for a plurality of rotors and the position calculation module of said control system are designed like the safety devices 130, 330 and the position calculation module 132. The safety device of the control system for a plurality of rotors comprises multiply all the modules necessary for the coordination between the position data 150 and the coil data 152 and described in association with FIGS. 1 to 3, with the result that one of the modules in each case is present for each of the rotors. In particular, such a safety device for each of the rotors can comprise in each case a position comparison module, a speed calculation module, a speed comparison module and a current pattern comparison module, which are in each case designed like the modules of the same names as described in association with FIGS. 1 to 3.

As described in association with the position comparison module 133, the individual position comparison modules assigned respectively to one of the rotors compare in each case the rotor position assigned to the relevant rotor with the energization position assigned to the relevant rotor. The error messages of the individual position comparison modules are combined in an emergency shutdown module of the safety device, wherein the emergency shutdown module is designed like the emergency shutdown module 137. If an error is present, the emergency shutdown module 137 of the safety device then causes the electric motor 10 to be transferred to a safe state.

The emergency shutdown apparatus 30 can also be designed to transfer the electric motor 10 to a safe state by virtue of the fact that only one of the rotors independently of the other rotors is transferred to a safe rotor state if an error concerning the respective rotor is discovered. Such a safe rotor state may consist, for example, in the stator coils 205 in the vicinity of the relevant rotor being switched to be currentless, or in a constant force being exerted on the relevant rotor. Such a safe state of the electric motor 10 can be realized in particular if the components of the emergency shutdown apparatus 30 are realized in stator control units which in each case control the energization of individual stator coils 205 or of a group of said stator coils.

The control system 100 of the drive 1 or the control system 302 of the drive 300 allows safe operation of the drive 1 or of the drive 300. In the context of the safe operation of the drives 1, 300, the energization of the stator coils 205 and the movement of the rotor 20 along the stator 200 can be certainly monitored by the safety devices 130, 330 of the control systems 100, 302. In this case, the monitoring of the movement of the rotor 20 can comprise monitoring the speed of the rotor 20 and monitoring the force exerted on the rotor 20.

The certain monitoring of the movement of the rotor 20 necessitates the presence of certainly determined information about the position of the rotor 20 in the safety devices 130, 330. This certainly determined information constitutes the secured rotor position 154. The secured rotor position 154 is determined on the basis of two data sets detected independently of one another at the stator 200 of the electric motor 10.

One data set is constituted by the position data 150, from which the rotor position 154 is determined and which are used by the control systems 100, 302 for the positional control of the rotor 20 as well. The other data set is constituted by the coil data 152, which represent the status of the stator coils 205 and from which the energization position 156 is determined by the safety devices 130, 330. The position data 150 and the coil data 152 are validated by the energization position 156 being compared with the rotor position 154. If the positions 154, 156 determined independently of one another match one another, it can be assumed that the coil data 152 and the position data 150 were detected without errors and communicated to the safety devices 130, 330 without errors.

On the basis of the validated coil data 152 and the validated position data 150, the safety devices 130, 330 can monitor the movement of the rotor 20, the energization of the stator coils 205 and the drive force exerted on the rotor 20.

Both the coil data 152 and the position data 150 are transmitted via the data transmission medium 50 from the stator 200 to the operating devices 40, 304 of the control systems 100, 302. A transmission of the coil data 152 via the secure data transmission channel 56 makes it possible to identify errors having a common cause during the transmission of the coil data 152 and the position data 150. In this case, the position data 150 can be transmitted via a non-safeguarded data transmission channel 52. The stationary connection of the stator coils 205 to the signal detection unit 114 of the position detection device 110 makes it possible that a fixed relative position of the signal detection unit 114 and of the stator coils 205 can be assumed during the monitoring of safe operation of the drives 1, 300.

The energization position 156 constitutes the position of the rotor 20 along the stator 200 that is determined from the coil data 152. Since the AC current signal 530 used for the drive of the rotor 20 is applied only to the stator coils 205 in the vicinity of the rotor 20, the energization position 156 can be determined in a simple manner from the coil currents through the stator coils 205 or from the activation state of the stator coils 205.

The invention claimed is:

1. A control system for a linear electric motor comprising a stator having a plurality of stator coils and a rotor movable along the stator,
wherein the control system is designed to control current sources of an energization device of a drive comprising the linear electric motor such that a current signal driving the rotor is only applied to said stator coils in an energization region in a vicinity of the rotor and such that the energization region shifts concomitantly with the rotor moving along the stator,
wherein the control system comprises a position detection device and a coil monitoring device,
wherein the position detection device is designed to generate position data representing a position of the rotor along the stator,
wherein the coil monitoring device is designed to generate coil data representing a status of one or a plurality of the stator coils,
wherein the control system comprises a position determining module designed to determine a rotor position on the basis of the position data,
wherein the control system comprises a safety device designed to carry out a coordination between the coil data and the position data,
wherein the safety device comprises a position calculation module designed to determine an energization position of the rotor within the energization region on the basis of the coil data,
wherein the safety device comprises a position comparison module designed to compare the rotor position with the energization position in the context of the coordination, and
wherein the safety device is designed to cause the linear electric motor to be transferred to an emergency shutdown if an error has been discovered during the comparison between the rotor position and the energization position.

2. The control system of claim 1,
wherein the safety device comprises a current pattern comparison module designed to compare the coil data with predefined setpoint coil data in the context of the coordination,
wherein the error comprises an error discovered during the comparison between the coil data and the predefined setpoint coil data.

3. The control system of claim 2,
wherein the current pattern comparison module is designed to determine a force on the rotor on the basis of the coil data and to compare the force with a predefined setpoint force,
wherein the error comprises an error discovered during the comparison between the force and the predefined setpoint force, and
wherein the predefined setpoint force is dependent on the position of the rotor.

4. The control system of claim 1,
wherein the safety device comprises a speed calculation module and a speed comparison module,
wherein the speed calculation module is designed to calculate a speed of the rotor on the basis of the position data and/or on the basis of the coil data,
wherein the speed comparison module is designed to compare the speed of the rotor with a predefined setpoint speed,
wherein the error comprises an error discovered during the comparison between the speed and the setpoint speed, and
wherein the predefined setpoint speed is dependent on the position of the rotor.

5. The control system of claim 1, wherein the coil data represent a coil current through one of the stator coils of the linear electric motor.

6. The control system of claim 1, wherein the coil data represent a voltage drop across one of the stator coils of the linear electric motor.

7. The control system of claim 1, wherein the coil data represent an activation state of one of the stator coils of the linear electric motor.

8. The control system of claim 1, wherein the safety device is embodied by means of safe functional components of the control system.

9. The control system of claim 1, wherein the control system is designed to apply a proximity current signal to at least one of the stator coils if the rotor of the linear electric motor is situated in the vicinity of the stator coil, wherein the proximity current signal exerts no drive force on the rotor.

10. A drive system having:
- a linear electric motor comprising a stator having a plurality of stator coils and a rotor movable along the stator,
- an emergency shutdown apparatus designed to carry out a transfer of the linear electric motor to an emergency shutdown, and
- a control system, wherein the control system is designed to control current sources of an energization device of a drive comprising the linear electric motor such that a current signal driving the rotor is only applied to said stator coils in an energization region in a vicinity of the rotor and such that the energization region shifts concomitantly with the rotor moving along the stator,
- wherein the control system comprises a position detection device and a coil monitoring device,
- wherein the position detection device is designed to generate position data representing a position of the rotor along the stator,
- wherein the coil monitoring device is designed to generate coil data representing a status of one or a plurality of the stator coils,
- wherein the control system comprises a position determining module designed to determine a rotor position on the basis of the position data,
- wherein the control system comprises a safety device designed to carry out a coordination between the coil data and the position data,
- wherein the safety device comprises a position calculation module designed to determine an energization position of the rotor within the energization region on the basis of the coil data,
- wherein the safety device comprises a position comparison module designed to compare the rotor position with the energization position in the context of the coordination, and
- wherein the safety device is connected to the emergency shutdown apparatus of the drive and designed to cause the emergency shutdown apparatus to carry out the emergency shutdown of the linear electric motor if an error has been discovered during the comparison between the rotor position and the energization position.

11. The drive system of claim 10, wherein the stator coils and a signal detection unit of the position detection device of the control system are arranged in a stationary manner with respect to one another and are integrated into a housing of the stator.

12. The drive system of claim 10, wherein the drive is designed to transmit the coil data by means of a secure data transmission channel via a data transmission medium connecting the stator to an operating device of the control system, wherein the control system is designed to transmit position data and coil data via the data transmission medium.

13. A method for controlling a linear electric motor of a drive, the linear electric motor comprising a stator having a plurality of stator coils and a rotor movable along the stator, wherein the method comprises:
- controlling current sources of an energization device of the drive such that a current signal driving the rotor is only applied to said stator coils in an energization region in the vicinity of the rotor and such that the energization region shifts concomitantly with the rotor moving along the stator,
- generating position data representing the position of the rotor along the stator, generating coil data, representing the status of one or a plurality of the stator coils,
- determining an energization position of the rotor within the energization region on the basis of the coil data,
- carrying out a coordination between the coil data and the position data,
- comparing the position of the rotor with the energization position in the context of the coordination, and
- causing the electric motor to be transferred to an emergency shutdown if an error has been discovered during the comparison between the position of the rotor and the energization position.

* * * * *